US006307287B1

(12) United States Patent
Garrett et al.

(10) Patent No.: US 6,307,287 B1
(45) Date of Patent: Oct. 23, 2001

(54) HIGH-EFFICIENCY MOVING-MAGNET LOUDSPEAKER

(75) Inventors: Steven L. Garrett; Robert M. Keolian; Robert W. Smith, all of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/521,368

(22) Filed: Mar. 8, 2000

Related U.S. Application Data

(60) Provisional application No. 60/123,864, filed on Mar. 12, 1999.

(51) Int. Cl.$^7$ .............................. F03G 7/00; F25B 9/00; H02K 7/14; H02K 33/02

(52) U.S. Cl. ......................... 310/30; 310/17; 324/76.49; 359/199; 62/6; 62/467

(58) Field of Search .................................. 310/13, 15, 17, 310/23, 30, 34, 38, 306; 60/517, 521, 721; 62/6, 467; 324/76.49; 359/199

(56) References Cited

U.S. PATENT DOCUMENTS

| 4,398,398 | 8/1983 | Wheatley et al. ................ 62/467 R |
| 4,489,553 | 12/1984 | Wheatley et al. .................... 60/516 |
| 4,632,501 | 12/1986 | Glynn ................................... 350/6.6 |

(List continued on next page.)

OTHER PUBLICATIONS

Rudnick "Unconventional reciprocity calibration of transducers" J. Acoust. Soc. Am. 63(6), Jun. 1978, pp. 1923–1925.
Swift "Thermoacoustic engines" J. Acoust. Soc. Am. 84(4) Oct. 1998, pp. 1145–1180.
Wakeland "Lessons from a Thermoacoustic Refrigeration Demonstration Device" The Pennsylvania State University, The Graduate School, Graduate Program in Acoustics, thesis submitted in partial fulfillment of the requirements for the degree of Master of Science, May 1999.
Ward "Cost–effective electrodynamic drivers with improved efficiency for thermoacoustic refrigerators" J. Acoust. Soc. Am., vol. 100, No. 4, Pt. 2, Oct. 1996; 3rd Joint Meeting: Acoustical Societies of America and Japan.
Wakeland "Use of electrodynamic drivers in thermoacoustic refrigerators" J. Acoust. Soc. Am. 107 (2), Feb. 2000, pp. 827–832.
Garrett et al. "Thermoacoustic Refrigerator for Space Applications" Journal of Thermophysics and Heat Transfer, vol. 7, No. 4, Oct–Dec. 1993, pp. 595–599.

*Primary Examiner*—Nestor Ramirez
*Assistant Examiner*—Judson H. Jones
(74) *Attorney, Agent, or Firm*—Gifford, Krass, Groh, Sprinkle, Anderson & Citkowski, PC

(57) ABSTRACT

A thermoacoustic driver incorporates a linear electrodynamic motor having electrical terminals and a moving part, a driver suspension housing, a piston, and a stiffness-enhancing device for raising the mechanical resonance frequency of the electrodynamic motor without reducing the piston stroke. The stiffness enhancement is accomplished by the use of specially optimized suspension spring structures and/or by attaching one or more electrical inductors to the electrical terminals of the driver. The stiffness enhancement using mechanical springs incorporates one or more starfish structures extending between the driver suspension housing and the piston and rigidly clamped to both. The starfish structures comprise radially extending legs, which are leaf springs or beams of varying width. The shape of the beams and the shape of the overall spring structure are optimized to enhance flexural or torsional stiffness and relieve arc tension within the constraints of cost-effectiveness. In one version, two modified triangular (trapezoidal) cantilever beams are connected through a straight middle section and form a bow-tie shaped beam.

27 Claims, 15 Drawing Sheets

U.S. PATENT DOCUMENTS

| | | | |
|---|---|---|---|
| 4,722,201 | 2/1988 | Hofler et al. | 62/467 |
| 4,858,441 | 8/1989 | Wheatley et al. | 62/6 |
| 5,139,242 | 8/1992 | Yarr | 267/160 |
| 5,165,243 | 11/1992 | Bennett | 62/6 |
| 5,303,555 | 4/1994 | Chrysler et al. | 62/6 |
| 5,319,938 | 6/1994 | Lucas | 62/6 |
| 5,389,844 | 2/1995 | Yarr et al. | 310/15 |
| 5,515,684 | 5/1996 | Lucas et al. | 62/6 |
| 5,647,216 | 7/1997 | Garrett | 62/6 |
| 5,673,561 | 10/1997 | Moss | 62/6 |
| 5,813,234 | 9/1998 | Wighard | 62/6 |
| 5,848,174 | 12/1998 | Ki et al. | 381/404 |
| 5,850,319 | 12/1998 | Tangren | 360/104 |
| 5,857,340 | 1/1999 | Garrett | 62/6 |
| 5,901,556 | 5/1999 | Hofler | 62/6 |
| 5,914,835 | 6/1999 | Girard et al. | 360/104 |
| 5,946,164 | 8/1999 | Tracy | 360/104 |
| 5,946,165 | 8/1999 | Khan et al. | 360/104 |
| 5,953,921 | 9/1999 | Garrett | 62/6 |
| 5,996,345 | 12/1999 | Hofler | 60/517 |

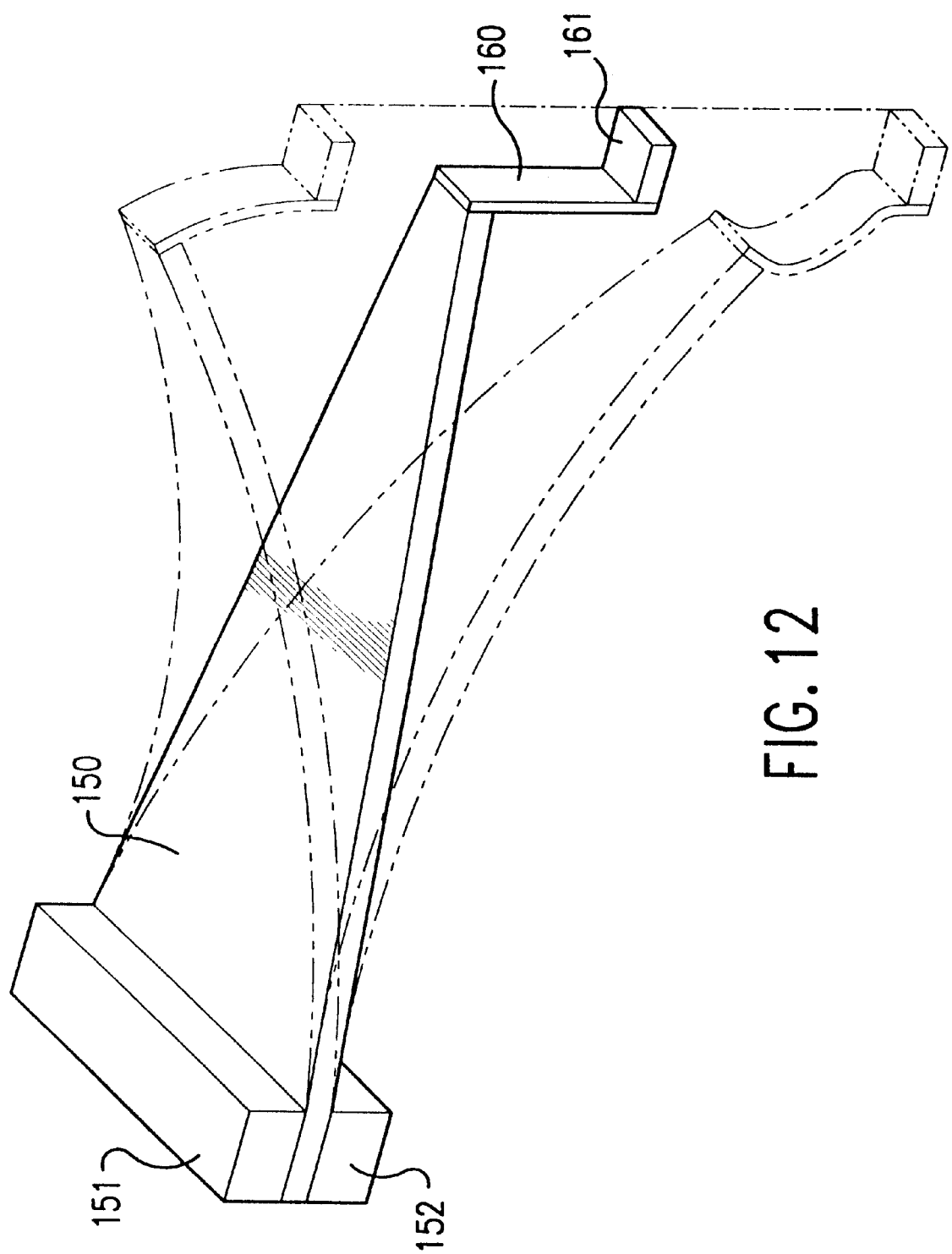

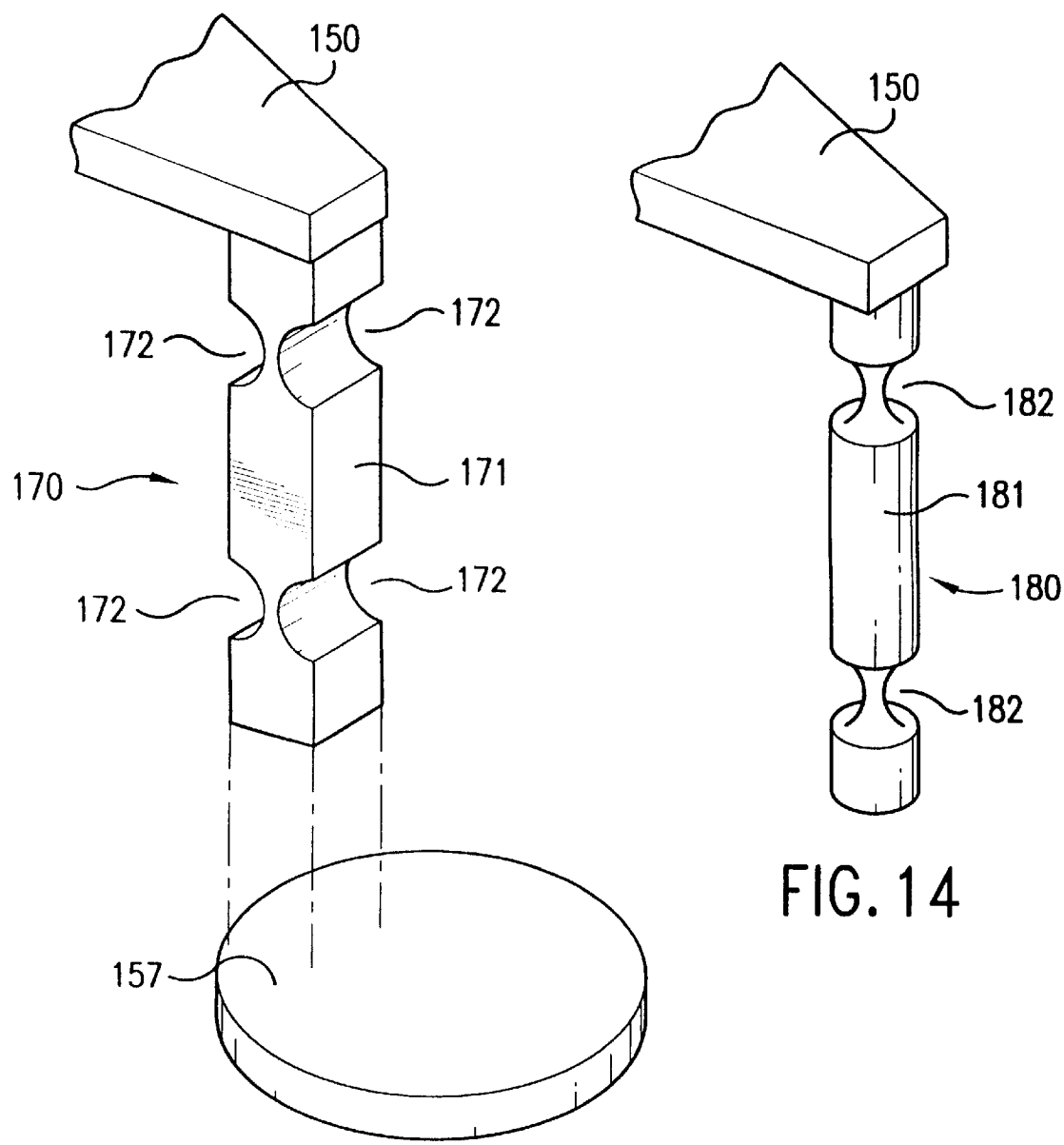

HIGH-EFFICIENCY MOVING-MAGNET LOUDSPEAKER

REFERENCE TO RELATED APPLICATION

This application claims the benefit of the priority date of the U.S. Provisional Patent Application Ser. No. 60/123,864, filed Mar. 12, 1999. The entire contents of the provisional application are fully incorporated herein by reference.

INCORPORATION BY REFERENCE

The following U.S. Patents are incorporate herein by reference:

U.S. Pat. No. 5,389,844 to Yarr and Corey; U.S. Pat. No. 5,139,242 to Yarr; U.S. Pat. No. 5,647,216 to Garrett; U.S. Pat. No. 4,398,398 to Wheatley, et al.

The following printed publications are incorporated herein by reference: Garrett, S. L., Adeff, J. A. and Hofler, T. J., "Thermoacoustic refrigerator for Space Applications," J. Thermophys. Heat Transfer, Vol. 7, No. 4, 595–599 (1993);

Rudnick, I., "Reciprocity calibration in unconventional geometries," J. Acoust. Soc. Am. Vol. 63, No. 6, 1923–1925 (1978);

Swift, G. W., "Thermoacoustic engines, " J. Acoust. Soc. Am., Vol. 84, No. 4, 1145–1180 (1988);

Wakeland, R. S., "Lessons from a thermoacoustic refrigeration demonstration device," Master's Thesis in Acoustics, Penn State University, December 1998 [the relevant contents of this reference are accessible in the printed publication: Wakeland, R. S., "Use of electrodynamic drivers in thermoacoustic refrigerators", J. Acoust. Soc. Am., Vol. 107, No. 2, 827–832 (2000)];

Ward, W. C., "Cost-effective electrodynamic drivers with improved efficiency for thermoacoustic refrigerators," Vol. 100, No. 4, Pt. 2, 2847 (1996).

STATEMENT OF GOVERNMENT RIGHTS

This invention was at least partially made with Government support under ONR Contract No. N00039-97-D-0042. The Government has certain rights to this invention.

FIELD OF THE INVENTION

In general this invention relates to the use of electrodynamic motors to create high-power, high-efficiency loudspeakers for generating high-amplitude waves in devices such as thermoacoustic refrigerators or acoustic compressors.

BACKGROUND OF THE INVENTION

Over the past fifteen years, a new class of refrigerators and heat engines has been developed. These devices utilize intrinsically irreversible thermal conduction or acoustical geometry to provide the proper phasing between pressure and volumetric velocity. This phasing produces useful quantities of heat pumping or cooling or generates mechanical work. These new engines are called thermoacoustic engines. Earlier engines required mechanical means, such as pistons, linkages, displacers, cams, valves and other mechanisms to realize useful cooling or produce mechanical work using more traditional reversible heat engine cycles, e.g., Stirling Cycle or Rankine Cycle. The heat pumping power of these new acoustic refrigerators depends upon the square of the acoustic amplitude—a doubling of acoustic pressure amplitude corresponds to four times the useful heat-pumping power. It is therefore important to be able to produce very high amplitude sound waves for use in such refrigeration devices.

Over the last decade, a new fluid pump that employs high-amplitude acoustic standing waves has also been developed, U.S. Pat. No. 5,319,938 and U.S. Pat. No. 5,515,684. These sound waves actuate reed valves that rectify oscillatory pressure to produce the mean flow and to permit continuous, unidirectional pumping of gases by the high-amplitude sound waves. A very high-power sound source is necessary to make this "sonic compressor" effective, and a highly efficient conversion from electrical to acoustical energy is required to make it economical.

Nearly all of the electrically driven thermoacoustic refrigerators patented and/or produced to date have used a moving-coil, electrodynamic loudspeaker to generate the required high-amplitude sound waves. These moving coil loudspeakers had several attractive features associated with their relatively low moving (dynamic) mass. The low mass meant that a fairly flexible suspension could be used to provide a high resonance frequency, usually in the range of several hundred Hertz. This lower moving mass also permitted the operating frequency of the thermoacoustic refrigerator to be adjusted over a modest range of frequencies to allow the system to be tuned over a small bandwidth without substantially degrading efficiency. Unfortunately, the moving-coil loudspeaker efficiency and power handling capacity is limited by the mass of conductor (typically copper, aluminum, or copper-cladded aluminum) in the coil.

The development of high flux density rare-earth magnetic materials (e.g., NdFeB) and the recent invention of a high-efficiency linear alternator which uses such magnets for mechanical-to-electrical power conversion, has made it practical to consider a moving-magnet electrodynamic system as a possible high-amplitude, high-efficiency electrodynamic sound source. The Yarr/Corey design, U.S. Pat. No. 5,389,844, uses several coils wound around a multi-pole laminated magnetic stator to increase the available mass of conductor by several orders-of-magnitude over the moving-coil loudspeaker without directly affecting the length of the magnetic gap or adding to the moving mass which, in the new moving-magnet configuration, is controlled by the mass of the moving rare-earth magnets.

An additional advantage to making the coil part of the magnetic stator is that the electrical leads which bring current to the coil do not have to flex to accommodate motion of the moving-magnet part of the motor. The flexure of the input current leads in a moving-coil electrodynamic motor is a fairly common cause of motor failure which the moving-magnet design avoids, thereby increasing its reliability over the moving-coil design.

To appreciate the utility of increasing the operating (mechanical resonance) frequency of such a moving-magnet driver by increasing its resonance frequency by the methods taught herein, one need only to examine the expression for the time-averaged acoustic power, $\Pi_{ac}$, supplied by a moving piston of area, $A_{piston}$:

$$\Pi_{ac} = \frac{F_1 v_1}{2} = \frac{p_1 A_{piston} v_1}{2} = \frac{p_1 U_1}{2} = \frac{p_1 A_{poston} \omega d_1}{2} \quad (1)$$

The variables sub-scripted with a "1" are the peak values of quantities which are assumed to have a sinusoidal time variation with a frequency $f=\omega/2\pi$. Observing that convention, the piston stroke (peak-to-peak displacement amplitude) is given by $2d_1$. Further calculation is simplified by the introduction of the piston's peak volumetric velocity, $U_1$ [m³/sec].

The above expression, Eq. 1, includes the simplifying assumptions that the piston speed, $V_1$, and the net force on the face of the piston, $F_1$, are in-phase. Although there are many circumstances of practical interest for which this assumption is not valid, the assumption is true for a piston that is driving an acoustic load which is oscillating at one of its acoustic resonance frequencies. A resonant acoustic load is commonly found in thermoacoustic refrigerators and sonic compressors.

The acoustic pressure amplitude, $p_1$, can be related to the volumetric velocity of the piston, $U_1$, by the introduction of an acoustic impedance, $Z_{ac}$ [Newton-sec/m$^5$], which is given by the ratio of the pressure to the volumetric velocity at the piston location.

$$Z_{ac} \equiv \frac{p_1}{U_1} \tag{2}$$

The acoustic impedance is a function only of the acoustic load presented to the piston and not a function of the drive mechanism.

Substitution of Eq. 2 into Eq. 1 demonstrates that the acoustic power delivered by the piston to the resonator characterized by $Z_{ac}$, is dependent upon the square of the product of the piston displacement, $d_1$, and the radian frequency, $\omega$ [rad/sec], of the piston's oscillation.

$$\prod_{ac} = \frac{p_1 U_1}{2} = \frac{Z_{ac}}{2} U_1^2 = \frac{Z_{ac}}{2}(d_1\omega)^2 A_{piston}^2 \tag{3}$$

It is clear that the full exploitation of moving-magnet electrodynamic motors for the generation of high-amplitude sound fields, with high electroacoustic efficiency, requires that the motors operate at the highest possible frequency, $\omega$, while maintain the ability to utilize their maximum allowable stroke, $2d_1$. Since the resonance frequency of such a motor, having a moving mass, $m_0$ [kg], is determined by the total suspension stiffniess, k [Newton/m], $$\omega = \sqrt{\frac{k}{m_0}} \tag{4}$$

it is desirable to increase the total suspension stiffness k without undue restriction on the motor stroke and with an effectively infinite fatigue lifetime for the spring.

The most common approach for providing auxiliary stiffness to increase the resonance frequency of a moving-magnet motor, commonly employed by the Stirling-Cycle engine community, is the use of a "gas spring." The advantage to the gas spring is that there are no material limitations, such as fatigue fracture, when gas pressure provides the additional restoring force (stiffness). One disadvantage to the gas spring is that there is irreversible thermal dissipation due to the adiabatic heating and cooling of the gas which accompanies the gas spring's compressions and expansions. This dissipation mechanism increases the motor's effective mechanical resistance, $R_m$, in addition to increasing its net suspension stiffness, k. Another disadvantage is that the gas spring stiffness is also dependent upon mean pressure, $p_m$, in the "back volume" which creates the gas spring, so the driver mechanical resonance will change if the mean operating pressure is changed.

An even more serious limitation to the gas-spring approach is that pressure behind the piston and in front of it are 90° out-of-phase if the driver is located at the pressure anti-node of the standing wave, or nearly 180° out-of-phase for the displaced driver location (located closer to the main portion of the resonator), so the piston seal (either a clearance seal or bellows) must accommodate a larger front-to-back pressure differential, $\Delta p$ [Pa], if a large spring constant is required, as is the case for moving-magnet motors. This excess front-to-back pressure differential will complicate the bellows design due to the required trade-off between the infinite-lifetime bellows excursion (stroke) and the pressure differential. It will also increase dissipation in a clearance seal, since "blow-by" losses increase proportionate to the square of the front-to-back pressure differential, $(\Delta p)^2$.

An advantage of gas springs is that their design is fairly straightforward. In addition to the front of the piston do ing work on the engine, the rear of the piston is used to adiabatically compress the gas in the back-volume, $V_0$ [m$^3$], behind the piston. This gas spring can provide a restoring force wi th an equivalent stiffniess, $k_{gas}$ [Newtons/m], which is related to the area of the piston of diameter D, $A_{piston}=\pi D^2/4$, the mean gas pressure, $P_m$, the ratio of specific heat at constant pressure to specific heat at constant volume, $\gamma=c_p/c_v$, and the volume of the gas trapped behind the piston, $V_o$:

$$k_{gas} = \frac{\gamma p_m A^2}{V_o} \tag{5}$$

The disadvantage of this design process is the requirement that $V_o$ be very small if a large gas stiffness is required. "Dead volume," required to accommodate the gas-filled volumes which contain essential components such as the coils, plunger, bellows, pole pieces, etc., limit how small the volume, $V_o$, can be made in practice.

Another prior-art approach for providing auxiliary stiffness to increase the resonance frequency of a moving-magnet motor is to use the uniform width rectangular cantilever leaf spring design. The leaf spring is composed of a beam which is has uniform length, L, width, w, and thickness, t. One end of the beam is clamped and its position is held fixed, while the other end is guided, i.e. clamped (forcing the slope of the spring to be zero at both clamping locations), but the position ofthe movable end of the beam can displace in a direction perpendicular to the clamping plane. Its transverse displacement from its equilibrium (F=0) position is designated, $y_A$ [m].

The spring constant, $k_{rect}$, of the rectangular clamped-guided cantilever is the ratio of the force, F, to the displacement of the movable end, $y_A$ [m], generated by that force applied to the movable end. For the rectangular cantilever of length, L [m], width, w [m], and thickness, t [m], $$k_{rect} = \frac{F}{y_A} = Ew\left(\frac{t}{L}\right)^3 \tag{6}$$

where E [Pa] is the Young's modulus of the spring material. The maximum material stress, $\sigma_{max}$ [Pa], occurs at both the upper and lower surfaces of the spring, which are at the maximum distance from the neutral axis ($\pm t/2$).

$$\sigma_{max} = \frac{3Ety_A}{L^2} = \frac{3Ey_A}{L}\left(\frac{t}{L}\right) \tag{7}$$

The above result for $\sigma_{max}$ can be used to express the spring constant in terms of the ratio of the maximum allowable stress, based on maximum stress, $\sigma_{fat}$ [Pa], dictated by the material fatigue considerations, to the Young's modulus, E.

$$k_{rect} = \frac{Ew}{27}\left(\frac{\sigma_{fat}}{E}\right)^3 \frac{L^3}{y_A^3} \qquad (8)$$

The form of Eq. 8 above is useful because the ratio of the maximum allowable stress in a material to its Young's modulus characterizes the fatigue properties of the material, its heat treatment history and its surface condition. It also shows that for a given material, the spring must be longer to accommodate a larger displacement if the maximum allowable stress in the material, $\sigma_{fat}$, is not to be exceeded. The thickness of such a spring is also determined by imposition of the maximum allowable stress constraint.

$$t_{rect} = \frac{\sigma_{fat}}{E}\frac{L^2}{3y_A} \qquad (9)$$

SUMMARY OF THE INVENTION

The present invention is directed to a high-power, high-efficiency thermoacoustic driver having electrical terminals and incorporating a stiffness-enhancing device. The thermoacoustic driver includes a linear electrodynamic motor, which could be of the moving-coil or moving-magnet type, but not limited to any specific design. The entire driver is supported by a suspension basket or housing. Auxiliary stiffness is provided to raise the mechanical resonance frequency of the motor and to stabilize the motor's motion without reducing the useful peak-to-peak displacement, or stroke, of the moving parts of the motor, whether they are magnets or coils.

One aspect of the invention is directed to a stiffness enhancement which is accomplished by attaching one or more electrical inductors to the electrical terminals of the driver. Another aspect of the invention is directed to a stiffness enhancement which is accomplished by the using one or more specially optimized mechanical spring structures and their associated supporting structural elements. A third aspect of the invention combines the use of inductors and mechanical spring structures.

The stiffness enhancement using spring structures incorporates one or more starfish structures occupying an essentially planar surface extended between the driver housing frame and the piston and clamped to both. Each starfish structure comprises radially extending legs, which are leaf springs or beams with their width forming a truncated (modified) triangular shape, or two modified triangular shapes connected through a straight middle section to form a beam in the shape of a bow-tie. The spring structures may be fabricated as one piece from spring plate or may incorporate individual beams, separately attached to the driver housing and the piston. The shape of the beams and of the overall spring structure are optimized to enhance flexural stiffness.

Another aspect of the invention is directed to spring structures having beams which are curved along their length to provide arc-tension relief. These spring structures are rotated by an angle of 360° divided by the number of legs and by the number of starfish spring structures.

Another aspect of the invention is directed to relieving arc tension by replacing the straight middle section of each bow-tie beam with an arc-tension relief spring having an oval or circular ring shape of constant or varying width, or having a right-handed or left-handed twist shape, the handedness alternating from beam to beam to maintain symmetry.

Another aspect of the invention is directed to starfish spring structures having legs which are beams with modified triangular sections and which are attached at their narrow end to the piston through columnar assemblies, comprising a middle connecting column and either end hinges or end attachments. The connecting column may be in the form of a flat strip or may be made of rectangular or circular stock. In one embodiment the columnar body and radial legs are all made in one piece.

Another aspect of the invention is directed to a starfish structure in which torsional elements in a direction perpendicular to the radial direction are incorporated at the wider end of the radial beams. In other embodiments, which provide predominantly torsional stiffness, the spring structure has an outer ring and an inner ring, and the surface in-between is occupied by radial elements incorporating loops or zigzag patterns. The loops or zigzag patterns have overall width decreasing from the outer to the inner ring.

BRIEF DESCRIPTION OF THE DRAWINGS

FIG. 12 is a dynamic perspective view of the beam of FIG. 11;

FIG. 13 is a perspective view of one embodiment of the connecting column of the columnar assembly of FIG. 11;

FIG. 14 is a perspective view of another embodiment of the connecting column of the columnar assembly of FIG. 11;

DETAILED DESCRIPTION OF THE INVENTION

Figure 1:
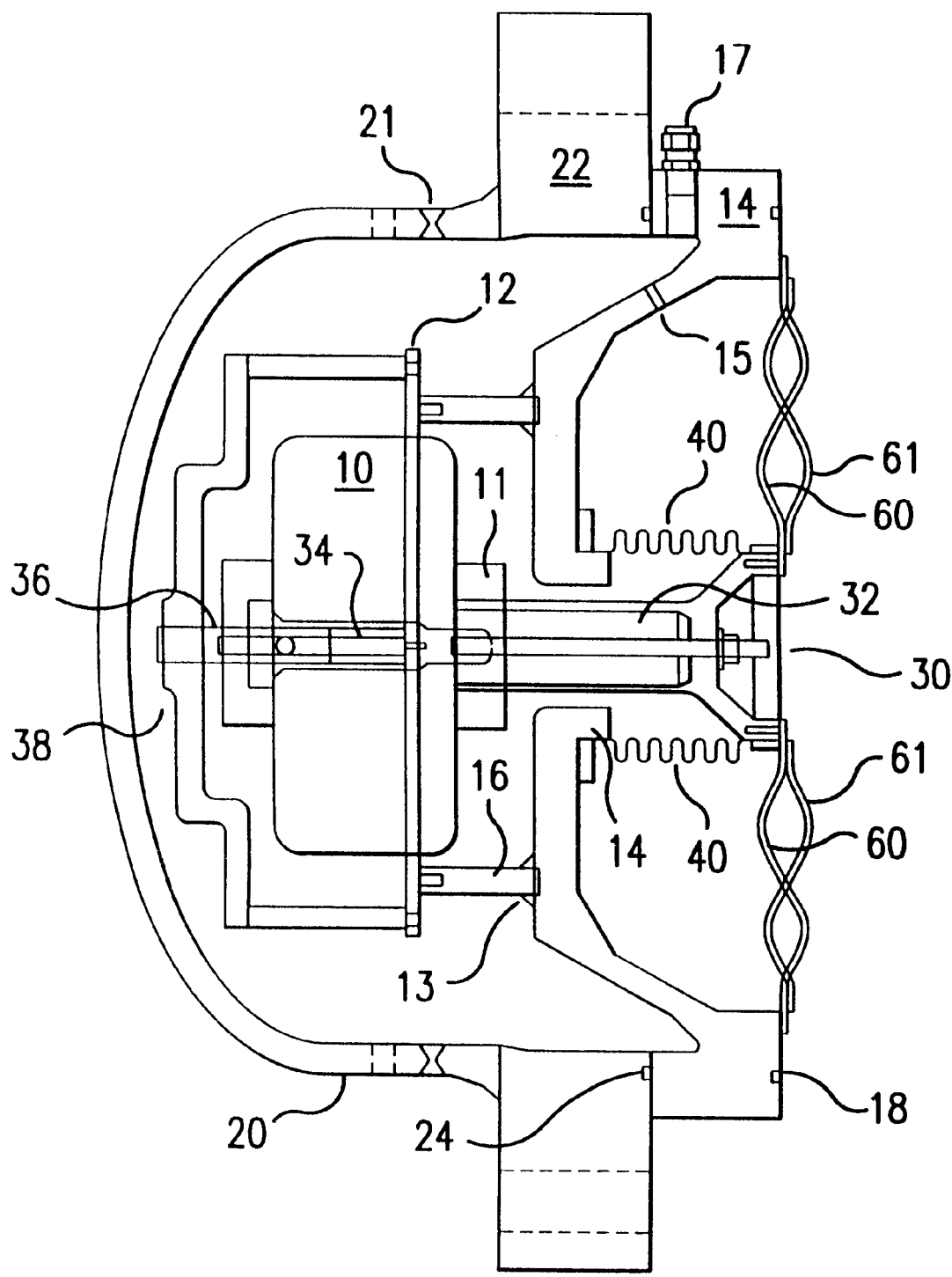
FIG. 1 is a cross-sectional diagram of a thermoacoustic driver with a linear electrodynamic motor according to the invention.

The invention is now described in reference to the figures. FIG. 1 is a cross-sectional diagram of a complete thermoacoustic driver, except for a resonator, to which it would be attached that is not shown. The driver includes an electrodynamic motor, which could be of the moving-coil or moving-magnet type. In this embodiment of the invention, the driver incorporates a Yarr/Corey type of moving-magnet electrodynamic motor having a stationary part 10, a moving part 11, and a mounting ring 12. The mounting ring 12 is bolted to a mounting cylinder 16, which is welded at an intersection 13 to a driver suspension basket or housing 14.

The driver suspension basket 14 supports the entire driver and allows the driver to be joined to an acoustic resonant load or resonator, which is not shown in FIG. 1. A piston 30 is attached to the moving part 11 of the motor with a tension bolt 32. The tension bolt 32 also contains a moving portion of a displacement transducer 34. The stationary part of the displacement transducer 36 is supported by a position transducer bridge 38, which is affixed rigidly to the driver mounting ring 12. A flexible metal bellows 40 provides a gas-tight pressure seal between the piston 30 and the driver suspension basket 14.

Figure 2:
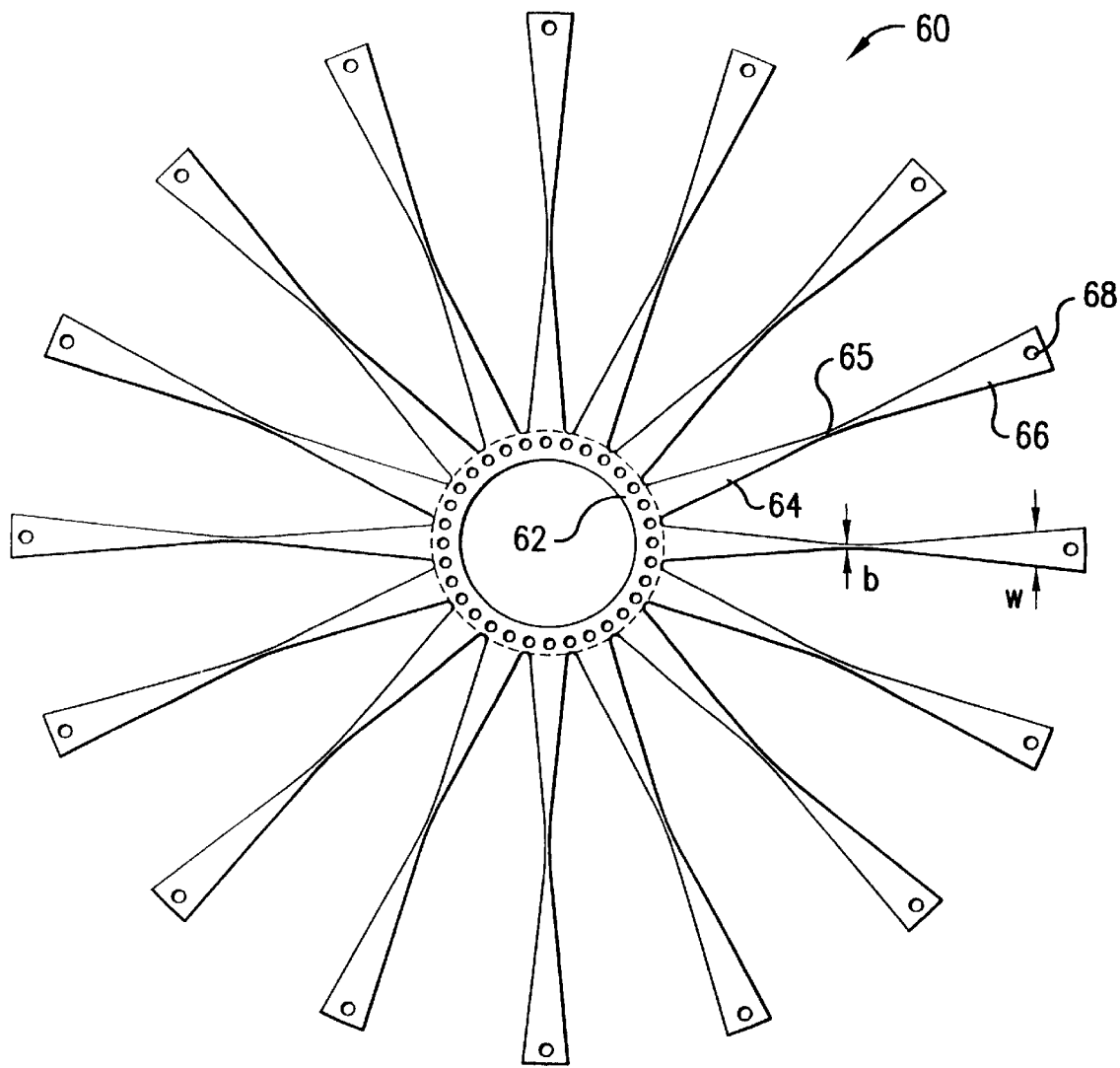
FIG. 2 is a plan view of a 16-legged starfish spring-structure of the invention incorporating curved modified triangular cantilever bow-tie beams.

Two suspension spring structures 60, 61 are rigidly clamped between the driver suspension basket 14 and the piston 30 to provide additional restoring force and enhance the stiffness of the motor. Any number of spring structures could be used since the spring structures are rotated with respect to each other to avoid interference. Although not visible in FIG. 1, in this embodiment each of the two spring structures 60, 61 that are used has sixteen legs, as shown in FIG. 2. The first spring structure 60 curves toward the suspension basket 14 at the point nearest to the piston 30 and the second spring structure 61 curves away from the suspension basket 14 at the point nearest to the piston 30. Each leg comprises two cantilever beams of constant thickness t, with a length L and a width that decreases linearly from its greatest value, w, at the clamped end to a value b at the narrowest point. Each cantilever beam, which is also referred to as modified triangular cantilever, has a truncated triangular (trapezoidal) shape and the two beams are connected at their narrow ends through a rectangular beam, so that the entire leg has the appearance of a bow-tie shape. The advantage of using modified triangular cantilever beams as spring elements to construct the suspension spring structures is that their stiffness is much higher than that of an equivalent rectangular cantilever beam. An approximate expression for the stiffness, $k_{MTC}$, of a modified triangular cantilever, which may be used for design purposes, is given by the following equation:

$$k_{MTC} \cong \frac{Ew}{14}\left(\frac{\sigma_{max}}{E}\right)^3 \frac{L^3}{y_A^3} \tag{10}$$

This stiffness is a little smaller than the stiffness of a (non-truncated) triangular cantilever, which is given by a similar expression, but with a factor of 12 instead of 14 in the denominator. The spring stiffness of a rectangular cantilever is on the other hand, given by Eq. 8 and has the factor 27 in the denominator.

A conservative minimum value of the spring width at the narrow central bow-tie section, $b_{min}$ [m], of the modified triangular cantilever beam can be determined by calculating the deflection tensile stress caused by the deflection of the beam elements at the central bow-tie section, $\sigma_{def}$, based on an elementary beam theory and using a safety factor of 2 over the fatigue stress of the material of the beam, $\sigma_{fat}$:

$$\frac{b_{min}}{w} = \frac{L^2}{6y_{A}t}\left(\frac{\sigma_{fat}}{E}\right)^2 \tag{11}$$

For the design parameters of this invention, $b_{min}$ will be smaller than practical, so it can be set by convenience or other requirements (e.g., installation robustness or moving spring mass).

The driver suspension basket 14 contains a sufficient number of pressure feed-through ports 17 (only one is shown) to allow the electrical leads for the driver coil and the enclosed sensor electronics to pass from the pressurized interior of the rear of driver suspension basket 14, to the amplifiers and instrumentation located at ambient atmospheric conditions, outside the driver and the resonator. An O-ring groove 18 is a means to provide a high-pressure, gas-tight seal to the resonator. A small leakage passage 15, is provided to equilibrate any static gas pressure difference between the front and rear sides of driver suspension basket 14. The length and bore of the static pressure equilibration leakage passage 15 is chosen so that its flow resistance will be large enough that the dynamic (acoustic) pressure difference, created by the driver through the motion of the piston, will have insufficient time to equilibrate through the static pressure leakage passage and will thus cause negligible energy loss. The side of the driver suspension basket with O-ring groove 18, which faces the resonator, will be called the front of the driver.

The rear of the driver is contained within a pressure housing which includes a hemi-ellipsoidal shell 20, which is welded to a mounting flange 22. The mounting flange 22 is used to join the driver to a resonator, which is not shown. The mounting flange 22 also contains an O-ring groove 24, which is used to provide a gas-tight pressure seal. The rear section of the driver contains the motor 10.

FIG. 2 is a plan view of a sixteen-legged version of a suspension spring structure 60 showing a piston mounting ring 62 containing thirty-two holes for clamping to the piston 30. Each leg comprises an inner modified triangular cantilever 64 and an outer modified triangular cantilever 66 joined by a straight (rectangular) spring section 65 to form a bow-tie. Each of the sixteen outer modified triangular cantilevers 66 has a mounting hole 68, which is used to rigidly clamp the suspension spring structure 60 to the driver suspension basket 14. In this embodiment of the present invention, the narrow central section has a width b of 0.109 inches. In this same embodiment, each truncated triangular leg of the spring structure had length of 2,625 inches, and greatest width, w, of 0.684 inches.

Figure 3A:
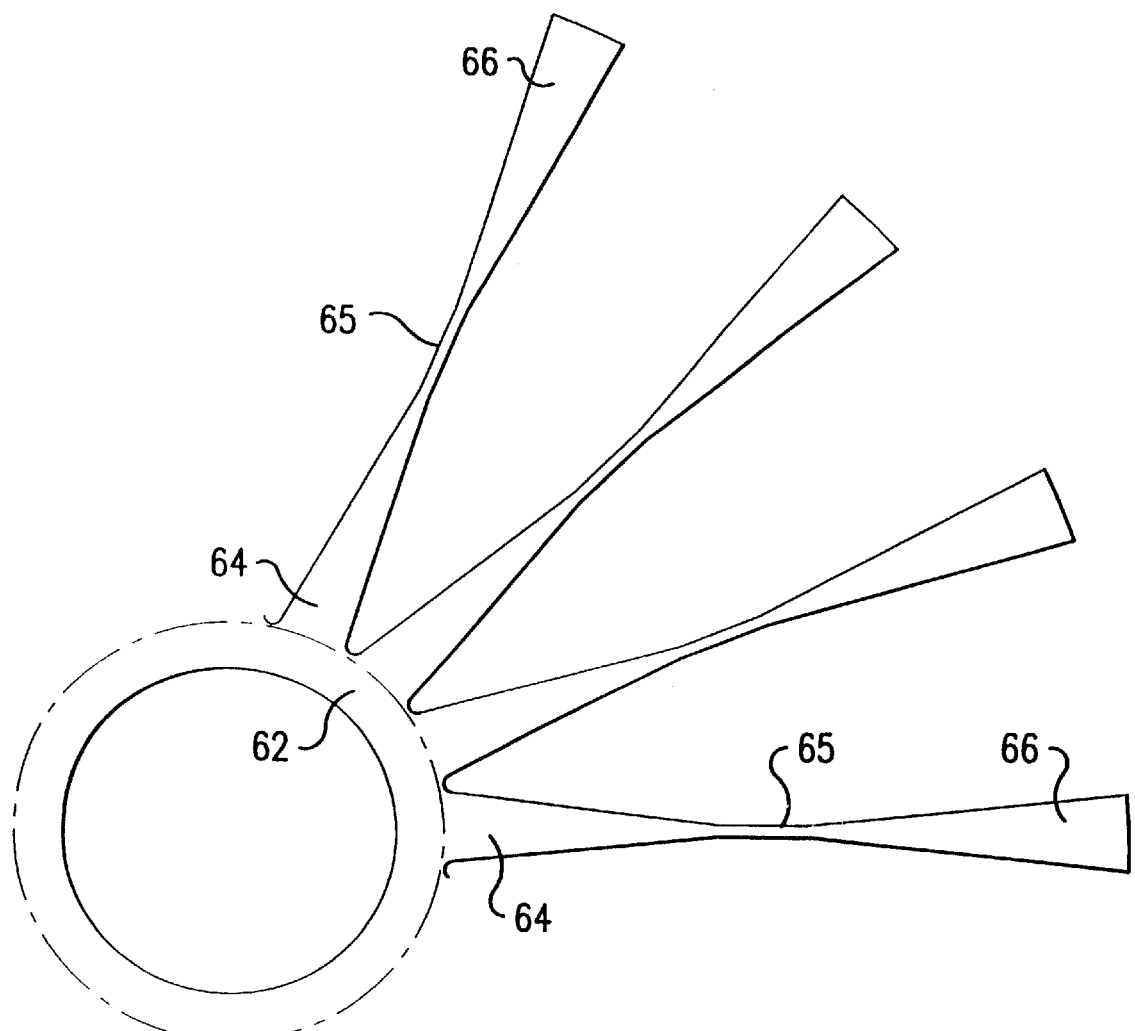
FIG. 3a is a plan view of a portion of a 16-legged starfish spring-structure of the invention incorporating the curved modified triangular cantilever bow-tie beam.
Figure 3B:
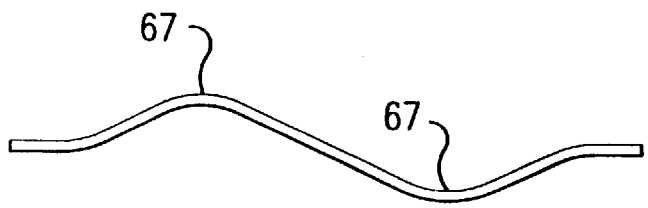
FIG. 3b is an elevation view showing the curvature of one leg in a 16-legged starfish spring-structure of the invention incorporating the curved modified triangular cantilever bow-tie beam, for the relief of arc-length tension.

FIG. 3a is a plan view, and FIG. 3b is an elevation view of a portion of the spring structure 60 showing curved spring legs 67, the purpose of the curvature being to relieve arc length tension in this embodiment. Arc length tension arises because the projected horizontal distance between the clamping points of a bow-tie leg spring element remains fixed as the leg undergoes the necessary vertical deflections. This "guided" motion leads to tension, in addition to flexural strain. The length of the leg must increase, since the length of the deflected leg must be longer than the direct (undeflected) distance between the two clamping points of the leg. This effect, if not addressed explicitly, would cause tensile stresses, $\sigma_{arc}$ [Pa], which exceed the maximum allowable stress, $\sigma_{fat}$. Simple geometry and the small angle approximation (sin x≈x) yields, $$\frac{\sigma_{arc}}{E} = 4\left(\frac{y_A}{L}\right)^2 \quad (12)$$

For a typical length of L≈6.5", an arc stress equal to the maximum allowable (fatigue failure) stress would limit the spring excursions, $y_A$, to unacceptably small values of the order of a few thousandths of an inch.

In the embodiment of FIG. 3b, the modified triangular cantilever bow-tie beam is bent into an S-curve. If the spring material is bent into the arc of a circle with half-angle, θ, and radius of curvature, R [m] and a displacement in the direction of the chord, $\delta_{HA} \leq y_A^2/L$ [m], is imposed, there is a restoring force, $H_A$, given by:

$$H_A = \frac{\delta_{HA} t^3 E w}{12 R^3 \theta (\cos\theta)^2} \quad (13)$$

according to the standard reference *Roark's Formulas for Stress and Strain*, 6$^{th}$ ed. For spring dimensions which are relevant to this invention, the stresses produced by the force of Eq. 13 are far smaller than $\sigma_{fat}$. In this embodiment, each of the two spring structures 60, 61 that are used has sixteen legs, as shown in FIG. 2. The first spring structure 60 curves toward the suspension basket 14 at the point nearest to the piston 30 and the second spring structure 61 curves away from the suspension basket 14 at the point nearest to the piston 30. The suspension spring structures 60, 61 are also rotated by an angular difference of 360° divided by the total number of legs for both structures, which is (2×16), so that the angle of rotation is 360°/(2×16)=11.25° to provide the maximum clearance between the curved portions of the springs, as is shown in FIG. 1.

Several other embodiments, which provide a strategy to remove the unacceptable arc length tensile stresses, $\sigma_{arc}$, without any degradation to the spring stiffness, are now described in connection to FIGS. 4 through 10.

Figure 4:
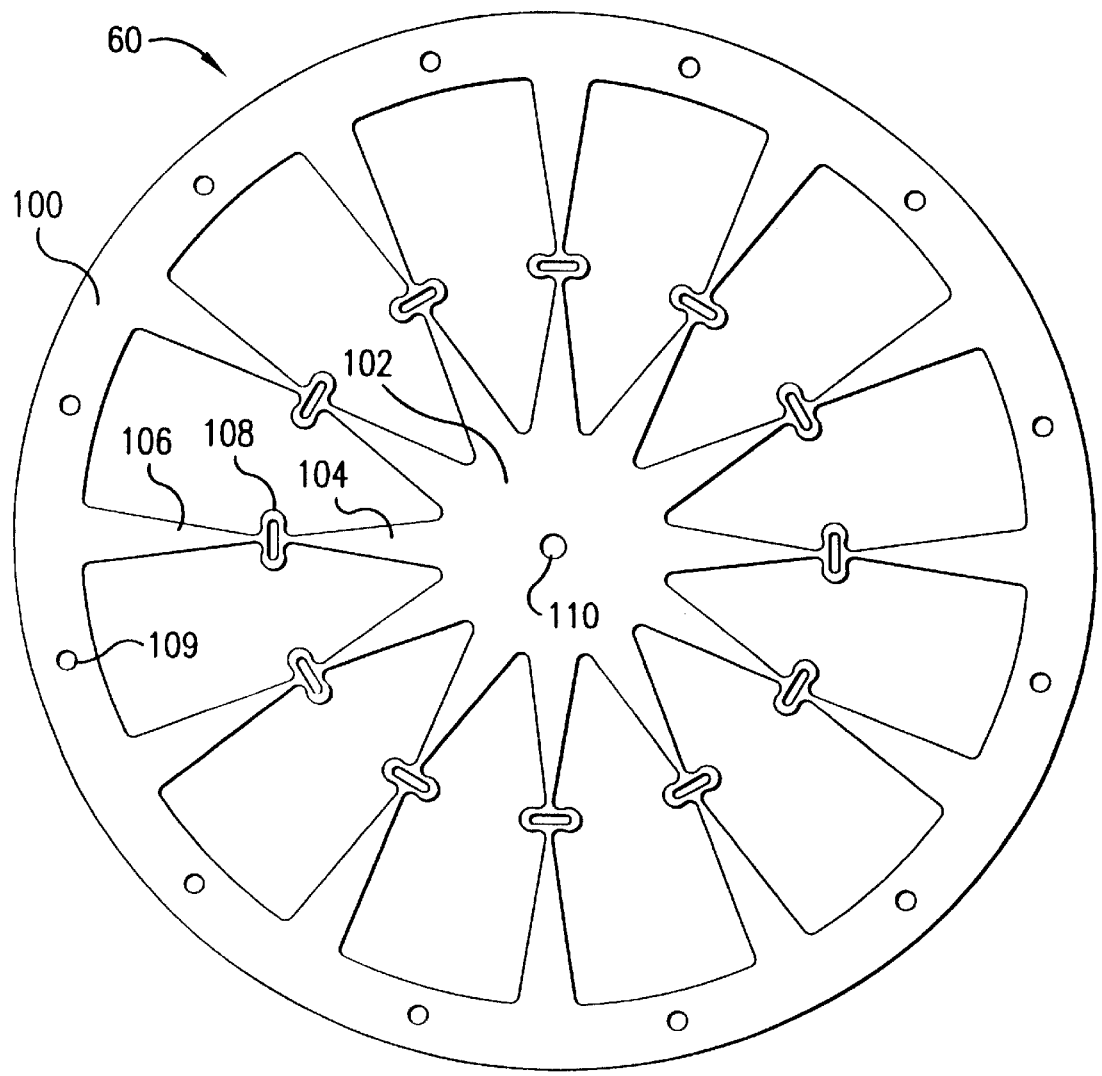
FIG. 4 is a plan view of a 12-legged starfish spring-structure of the invention incorporating modified triangular cantilever bow-tie beams.

FIG. 4 is a plan view of an embodiment of a suspension spring structure 60, which does not use curved legs to relieve arc tension, and therefore the spring structure is essentially a flat plate. The arc tension is relieved by the use of arc tension relief springs 108. The suspension spring structure 60 has a continuous outer clamping ring 100 and a piston clamping ring 102. The radial legs of the suspension spring structure incorporate inner modified triangular cantilever beams (springs) 104, which are attached to the piston clamping ring 102, and outer modified triangular cantilever beams (springs) 106, which are attached to the continuous outer clamping ring 100. The outer clamping ring 100 is attached to the driver suspension basket 14 with screws through holes 109. The piston clamping ring 102 is attached to the piston 30 with a bolt through a center mounting hole 110.

Because the arc length tension is relieved by tension relief springs 108 instead of curved spring sections 67, there is no need to bend the suspension spring structure 60 after fabrication from a flat sheet of material, thus greatly reducing the cost and fabrication processing time. A flat suspension structure makes the use of a solid single outer clamping ring 100 much easier. A single solid outer clamping ring facilitates the enforcement of a clamped boundary condition for the outer modified triangular cantilever beam 106. Much of the force needed to clamp the outer end of the modified triangular cantilever beams 106 is supplied by the outer ring 100, which is part of the spring structure 60 itself, rather than by the driver suspension basket 14, to which the suspension spring structure 60 becomes attached. This reduces the amount of fretting that might otherwise occur at the attachment point. Similarly, the center mounting hole 110 is placed away from the junction of the inner base of the inner modified triangular cantilever beam 104 and the piston clamping ring 102 to minimize fretting at the mounting hole 110.

FIGS. 5 through 10 show various embodiments of arc length tension springs 108. There is much freedom in the choice of these springs because they are positioned at the place in the bow tie between the modified triangular cantilever beams 104, 106 where the bending stresses tend to go to zero.

Figure 5:
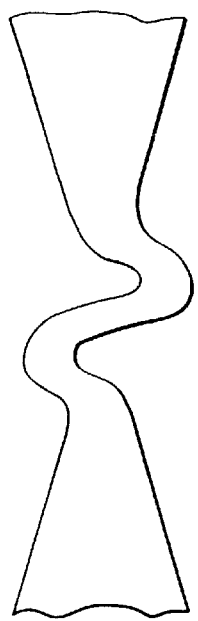
FIG. 5 is a plan view of one embodiment of a bow-tie beam incorporating a right-handed twist for relief of arc-length tension.

FIG. 5 shows an embodiment in which the arc length tension is relieved by a simple twist of the connecting section between the two modified triangular cantilever beams. Being in the overall plane of the spring structure 60, these twists can be cut at the same time the modified triangular cantilever beams and the other features of spring structure 60 are cut, thus being economical to produce. If all of the arc length tension springs in spring structure 60 are of the form shown in FIG. 5, there will be a breaking of rotational symmetry—the spring structure 60 will have a "handedness" that may cause a slight second order (at double the driver frequency) twisting of the piston clockwise or anti-clockwise as the piston is displaced from its equilibrium position, interfering with the proper operation of the electrodynamic motor 10. The handedness can be eliminated by using an even number of bow-tie spokes or legs in the spring structure 60 and alternating every other arc tension relief spring between the form shown in FIG. 5 and its mirror image shown in FIG. 6.

Figure 6:
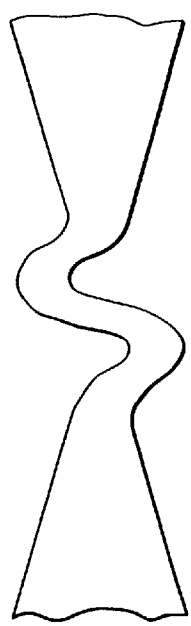
FIG. 6 is a plan view of another embodiment of a bow-tie beam incorporating a left-handed twist for relief of arc-length tension.

Although they have the advantage of simplicity, which might make them desirable to manufacture, the arc tension relief springs shown in FIGS. 5 and 6 apply a slight torque to the modified triangular cantilever springs 104 and 106, reducing the maximum stress available to store mechanical energy in the modified triangular cantilever springs. This can be remedied by the more symmetric form of arc tension relief springs shown in FIGS. 7 through 10, progressing roughly from simpler forms to slightly more complex, but advantageous forms of a general ring-type shape.

Figure 7:
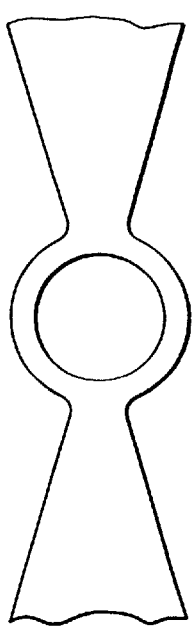
FIG. 7 is a plan view of an embodiment of a bow-tie beam incorporating a circular ring for relief of arc-length tension.

FIG. 7 shows an embodiment in which the arc tension relief spring is a circle of constant width (in the plane of the spring structure 60). It joins the modified triangular cantilever beams with a rounded edge to relieve stress at what would otherwise be a sharp corner. The width of this circular ring preferably is roughly half the width of the tip of the modified triangular cantilever sections to allow the bending moments to be smoothly transferred from one modified triangular cantilever spring to the other.

Figure 8:
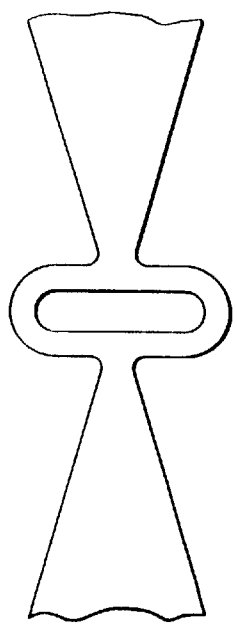
FIG. 8 is a plan view of an embodiment of a bow-tie beam incorporating an oval ring for relief of arc-length tension.

FIG. 8 shows an embodiment in which the arc tension relief spring is in the form of an oval ring. This geometry allows more of the radial distance between the piston clamping ring 102 and the outer clamping ring 100 to be used for the modified triangular cantilevers 104, 106. This form also allows for independent control of the stiffness of the arc-length tension-relief spring by controlling the length of the oval ring in the direction transverse to the line connecting the cantilevers 104, 106. Longer oval rings relieve more of the arc-length tension.

Figure 9:
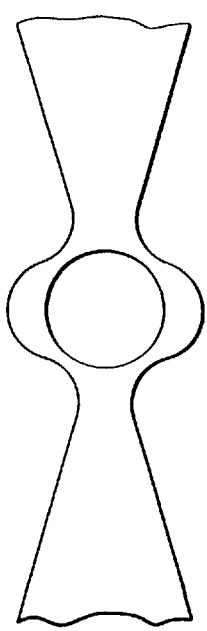
FIG. 9 is a plan view of an embodiment of a bow-tie beam incorporating a circular ring of variable width for relief of arc-length tension.

FIG. 9 shows another embodiment featuring the circular form of FIG. 7 for the arc tension relief spring, but with a varying width. The width of the circular ring is increased where the bending stress in the ring is high, and thinned out where it is low to achieve a more nearly uniform maximum bending strain and more uniform energy storage around the ring caused by the arc tension. This modification is based on the same considerations that led to the use of modified triangular cantilever beams 104, 106 instead of rectangular cantilever beams. Thus the ring is made wider near the "poles" of the circle, at the junction with the modified triangular cantilever springs 104, 106, by the rounded edge, and at the "equator," at the center of the bow-tie, and is thinned out in between the poles and the equator.

Figure 10:
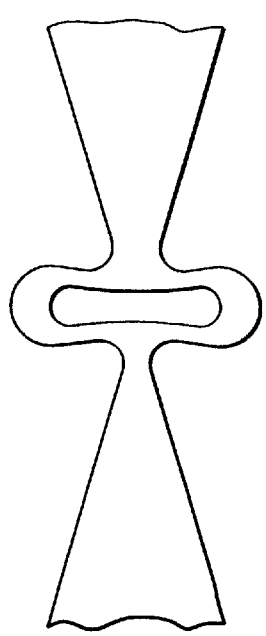
FIG. 10 is a plan view of an embodiment of a bow-tie beam incorporating an oval ring of variable width for relief of arc-length tension.

FIG. 10 shows a preferred embodiment that combines all the advantages of the previous embodiments of the arc tension relief springs shown in FIGS. 5–9, i.e. a flat construction, rotational symmetry, control of arc length tension stiffniess, uniform bending strains and uniform energy storage.

Figure 11:
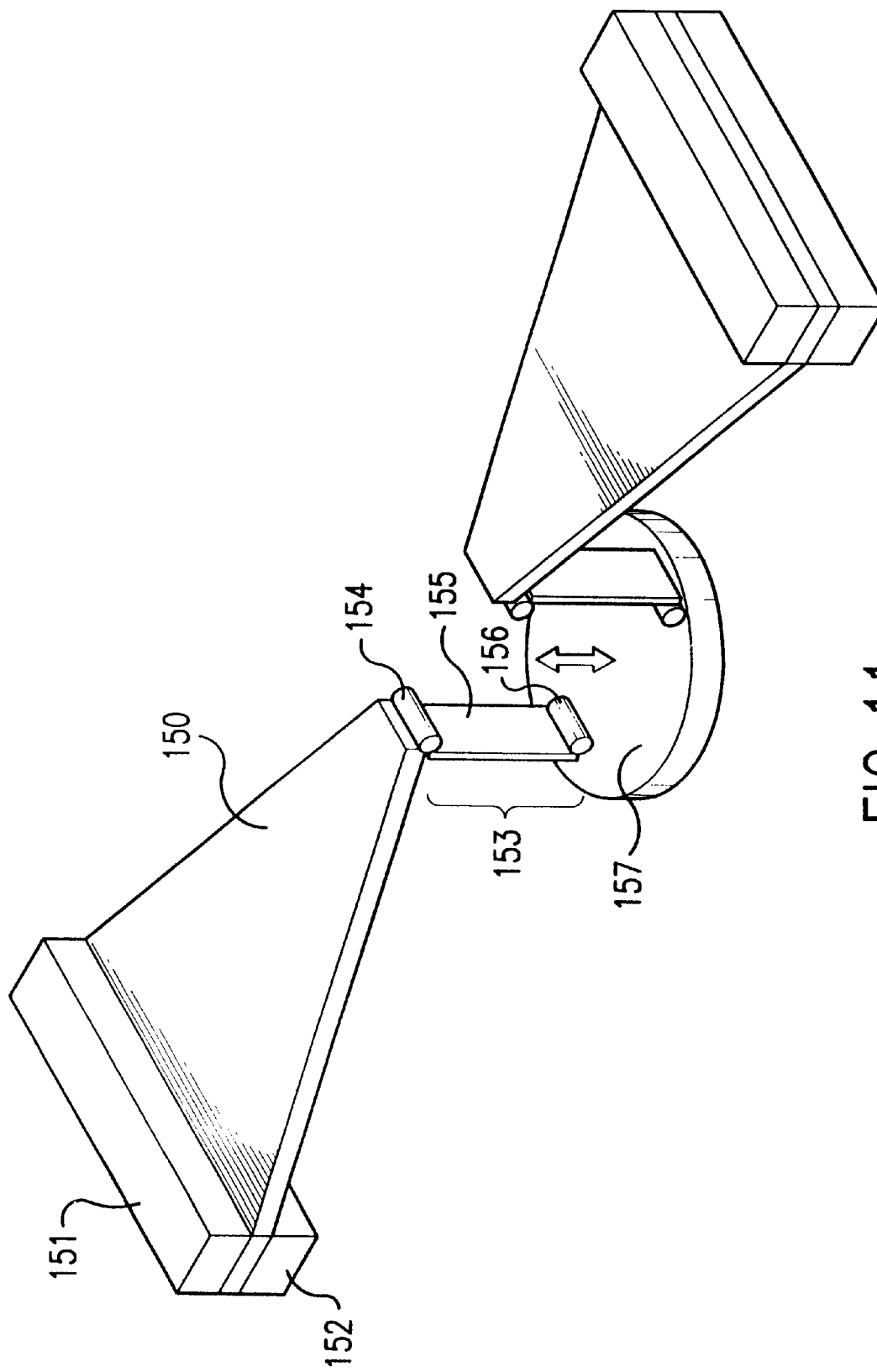
FIG. 11 is a perspective view of an alternative embodiment of a tapered beam attached to the piston plate through a columnar assembly.

FIG. 11 shows a perspective view of two radial legs of an alternate embodiment of the suspension spring structure 60. In this alternate embodiment, a plurality of radial legs comprising single, rather than bow-tie, modified triangular cantilever beams are utilized, and the boundary conditions are essentially of the clamped-pinned type. A plurality of modified triangular cantilever springs 150 are clamped between clamping supports 151, 152, one of which may be part of the driver suspension basket 14. The tip of the modified triangular cantilever spring 150 is connected to a piston clamping plate 157 through a columnar assembly 153, which generally comprises a connecting column part 155 with hinging or pinning end parts 154, 156. The columnar assembly 153 may in fact be all one piece with different areas primarily serving the functions of pinning or hinging parts 154, 155, 156, as described below. The alternate embodiment of radial legs for the suspension spring structures shown in FIG. 11 has the advantage that it uses material and space more efficiently. Therefore, it can be made to be more compact and store more energy. Also, it has less moving or dynamic mass, thus it can be used at higher operating frequencies.

FIG. 12 shows in a perspective view how the alternate embodiment incorporating a columnar assembly works in operation. A modified triangular cantilever spring 150 is shown in three different positions, exaggerated for clarity. The columnar assembly is shown as a semi-rigid one-piece column or strut 160, the top and bottom of which function approximately as hinged ends. A block 161 represents the piston clamping plate, 157 of FIG. 11, moving in a guided vertical path with fixed horizontal orientation. It can be seen that if the connecting column, 160 of FIG. 12, is thin enough so that it can flex near its top and bottom but thick enough that it can do so without buckling, or yielding in compression or tension, then the vertical force generated by the modified triangular cantilever spring 150 will be transmitted to the piston clamping plate while allowing the modified triangular cantilever spring 150 to oscillate with nearly clamped-pinned boundary condition. It will also allow the tip of the modified triangular cantilever spring to move off of a purely vertical line, thus relieving arc-length tension that would otherwise occur, if the tip were constrained to move strictly along the piston's axis.

FIG. 13 shows one embodiment of a columnar assembly 170. It includes a connecting part 171 with hinged ends formed by indentations 172. It can be simply machined out of rectangular stock, and is easily attached to the modified triangular cantilever spring 150 and the piston plate 157 in a variety of ways, such as with a screw, or with a braze, solder or adhesive joint.

FIG. 14 shows another embodiment of a columnar assembly 180. It includes a circular connecting part 181 and hinges formed on either end by indentations 182. This embodiment allows for some transverse freedom of movement of the piston to ensure that misalignment of the suspension spring structure and the piston does not interfere with the proper motion of the moving part 11 of the electrodynamic motor 10.

Figure 15:
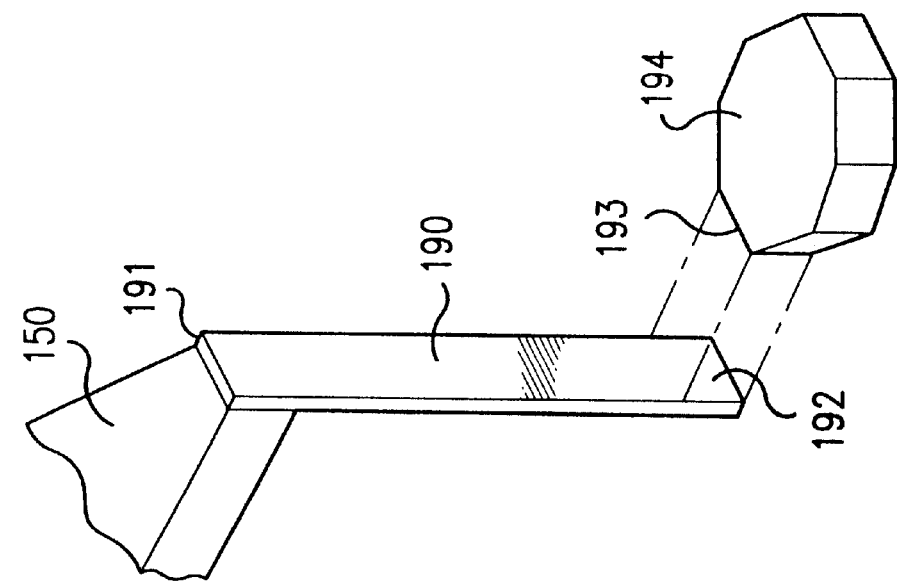
FIG. 15 is a perspective view of an alternative embodiment of a tapered beam, columnar assembly and piston plate.

FIG. 15 shows an embodiment in which the connecting column 190 is a flat strip. The flat strip 190 is rigidly attached to the tip of the modified triangular cantilever spring 150 by an attachment 191. The attachment can be made by a variety of methods, as long as these methods provide sufficient strength to take the shear and flexing forces at the point of attachment without adversely affecting the material properties of either part. Such methods include, for example, welding, brazing, soldering, or use of adhesive, but resistance welding is the preferred method. The connecting strip 190 is similarly attached by a joint 192 (shown exploded) to a flat face 193 on a segmented piston-attachment plate 194. This is the preferred embodiment for the connecting column, when simplicity is favored over performance.

Figure 16:
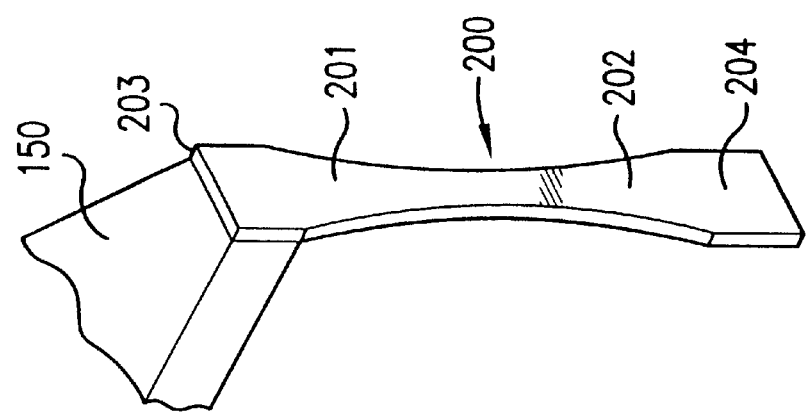
FIG. 16 is a perspective view of another embodiment of the connecting column of the columnar assembly of FIG. 15.

FIG. 16 shows an embodiment of a connecting column which is a flat strip 200 with tapered ends 201, 202. This embodiment allows for more uniform stress at the ends of the strip 200, thus reducing the possibility of fatigue. The endjoints 203, 204 are made as in FIG. 15.

Figure 17:
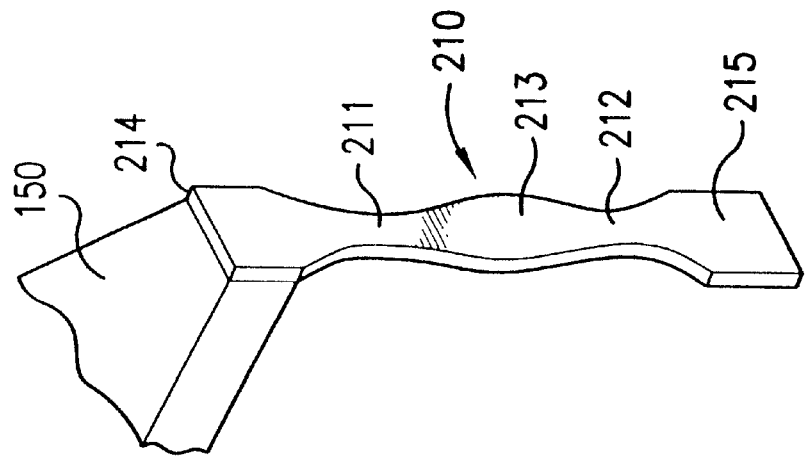
FIG. 17 is a perspective view of another embodiment of the connecting column of the columnar assembly of FIG. 15.

FIG. 17 shows an embodiment of a connecting column 210, which is a flat strip having tapered ends 211, 212 and a widened middle connecting section 213. The widened middle section strengthens the center of the column to discourage buckling of the column, while allowing the necessary flexing near the ends of the connecting column 210. The end joints 214, 215 are made as in FIG. 15. This is the preferred embodiment for the connecting column when performance is favored over simplicity.

Figure 18:
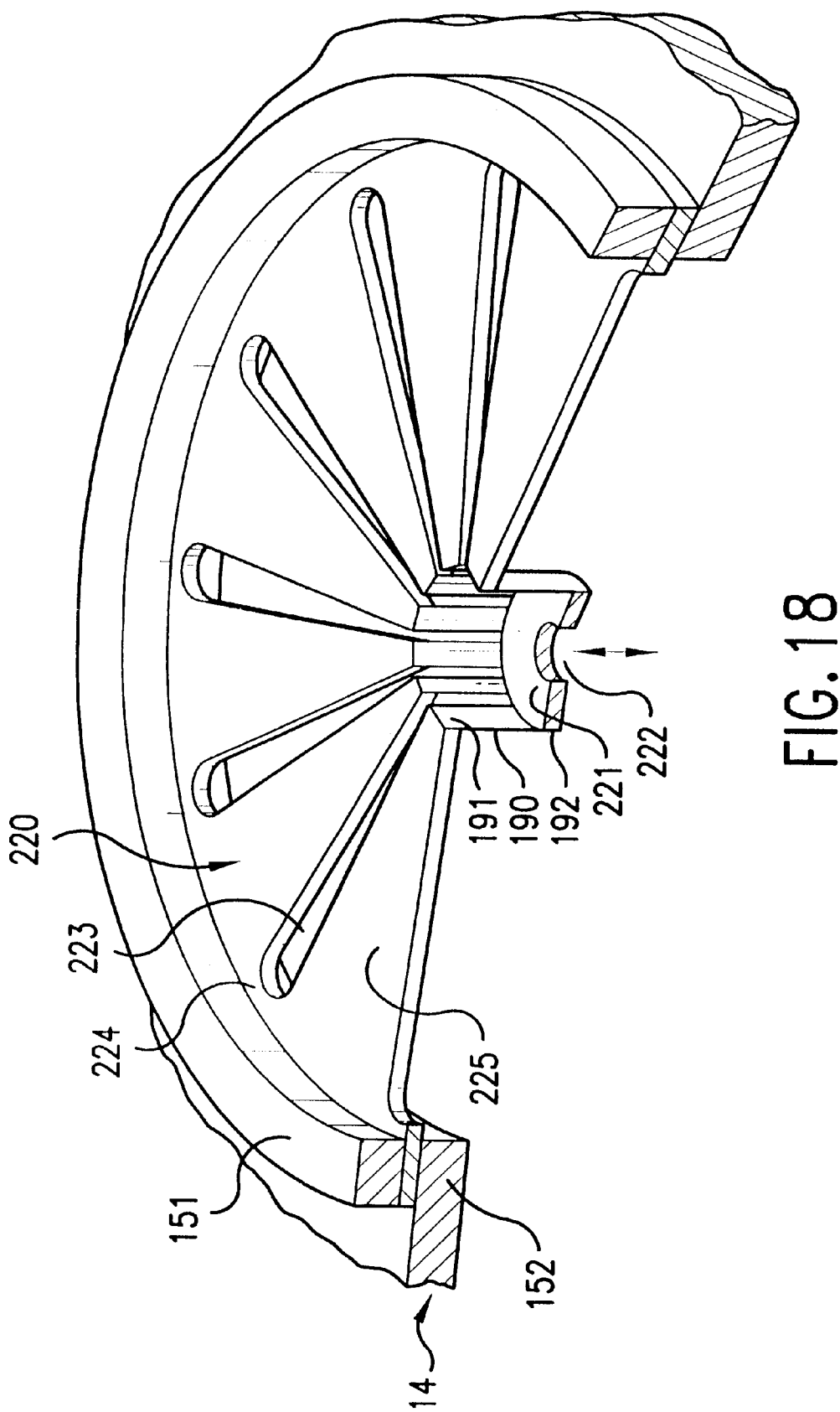
FIG. 18 is a perspective view of a cut away starfish spring structure of the invention incorporating tapered beams attached to the piston plate through columnar assemblies.

FIG. 18 presents the preferred embodiment for an alternate suspension spring structure that uses a plurality of single modified triangular cantilever beams instead of bow-tie beams. A suspension spring plate 220, preferably made of spring steel, has notches 223 cut into it to define modified triangular springs 225. The outside of the spring plate 220 is clamped between clamping supports 151, 152, one of which 152 is also part of the driver suspension basket 14. The portion 224 of the spring plate 220 between the clamping supports 151, 152 and the notch 223 helps relieve the bending stresses at the clamping supports, minimizing the tendency for fretting at the clamps. The tips of the modified triangular cantilever springs 225 are connected by joints 191 to connecting columns 190, also made preferably of spring steel. The bottoms of the connecting columns 190 are connected to a segmented piston-attachment plate 221 by joints 192. The piston attachment plate 221 is attached to the piston by a bolt through a hole 222. The preferred material for the piston attachment plate 221 is steel, and the preferred method of making the joints 191, 192 is resistance welding.

Figure 19:
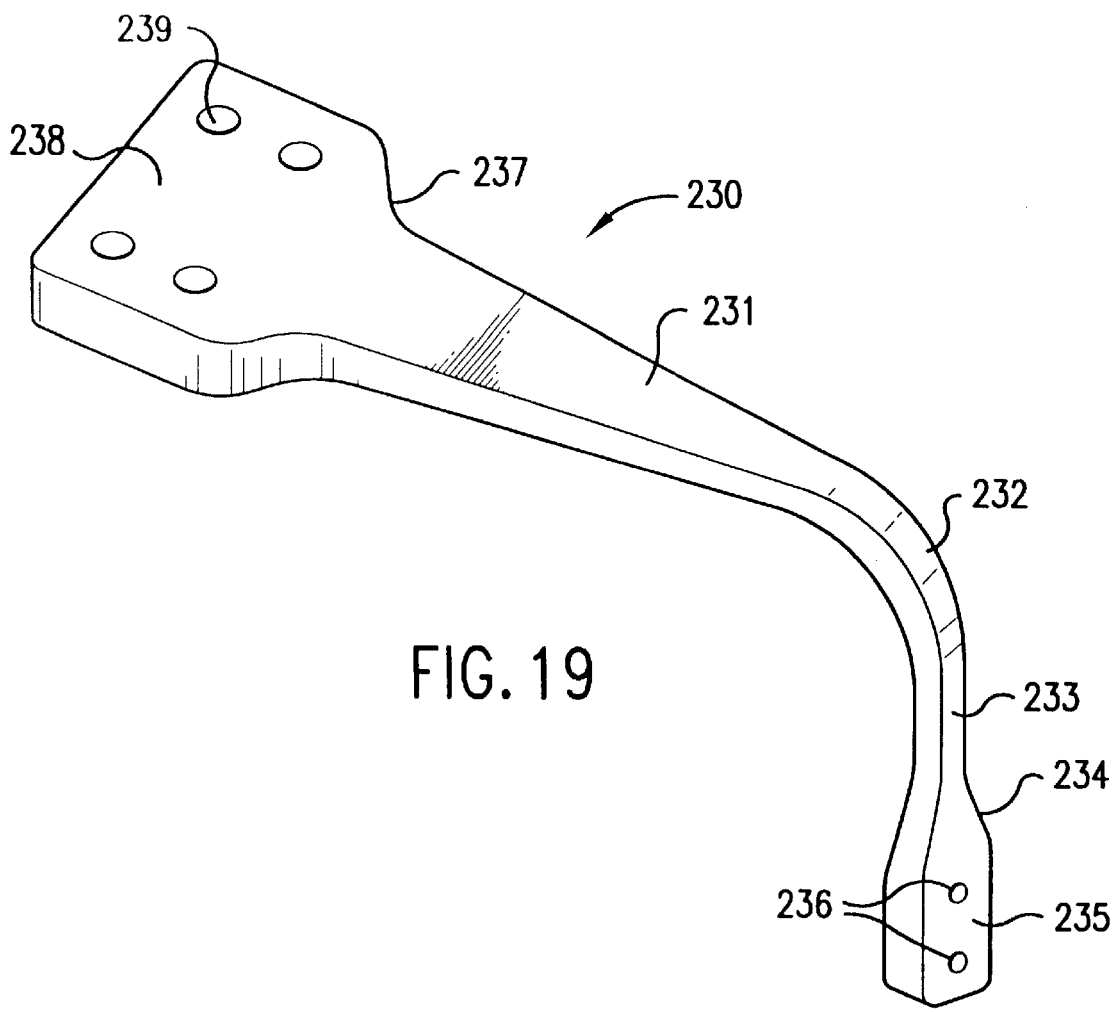
FIG. 19 is a perspective view of a tapered beam and columnar assembly that are made in one piece.
Figure 20:
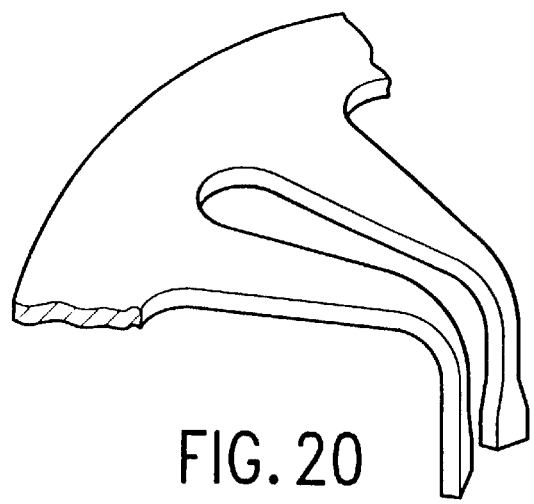
FIG. 20 is a perspective view of a portion of starfish spring structure of the invention incorporating the embodiment of FIG. 19 for each beam-columnar assembly, all in one integral piece.

FIG. 19 shows a radial spring element 230 of another embodiment of a suspension spring structure incorporating columnar assemblies. A modified triangular cantilever portion 231 stores most of the mechanical energy of the spring with nearly uniform bending strain throughout this portion. Arc length tension is taken out with a gradual bend 232 and a thin connecting column portion 233. Stress concentration is relieved by a flare 234 near an attachment plate 235. The attachment plate 235 could be attached to a piston attachment plate with screws passing through holes 236, as shown, or alternatively it could be attached with a more permanent joining method such as welding. Near the base of the modified triangular cantilever beam 231, stress is relieved by a flare 237. The spring element 230 is clamped at a clamping pad 238 between clamping supports 151, 152 (shown in FIG. 12) with screws passing through holes 239 or with a more permanent joining method such as a welding. A plurality of radial spring elements 230 can be constructed as separate pieces, as shown in FIG. 19, or constructed en masse in one integral piece, as shown in FIG. 20.

Figure 21:
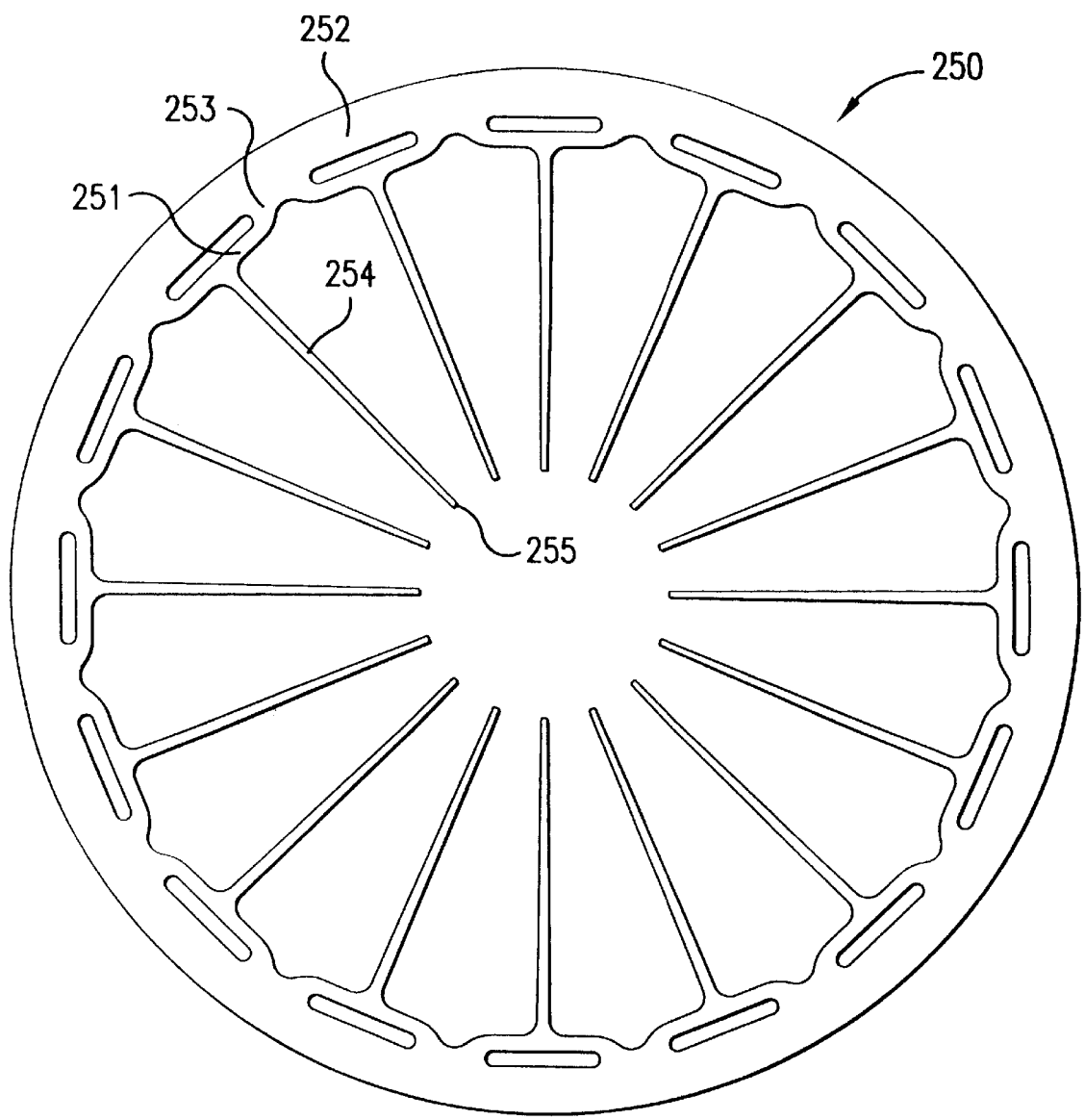
FIG. 21 is a plan view of an alternative embodiment of a starfish spring-structure of the invention incorporating torsional elements.

Another embodiment of the suspension spring structures 60 is presented in FIG. 21, which shows a suspension spring plate 250, preferably made of spring steel. Mechanical potential energy is primarily stored in torsional elements 251 which are in the azimuthal (perpendicular to the radial) direction. The torsional elements connect to an outer clamping ring 252 through connecting elements 253. Radial legs (or arms) 254 convert the rotational motion of the torsional elements 251 into translational motion directed along the piston axis direction (axial, out of the plane of the drawing). At the tips 255 of the radial legs any of the connecting column assemblies previously described in FIGS. 11–18 may be attached. The spring plate for this embodiment is thicker than the plate used for the previous embodiments, given the same restoring force and the same displacement and, therefore, the same total potential energy storage. Thus the radial legs 254 could be much less wide azimuthally than were the modified triangular cantilever springs of the previous embodiments for the same restoring force to the piston in the axial direction. The radial connecting leg that transmits the most axial restoring force with the least mass has the shape of a modified triangular cantilever, as described before. The leg is wider at its base near the torsional element 251 and becomes narrower toward its tip 255. Because the radial legs are thicker in the axial direction, however, and because the strength of a cantilever is proportional to the cube of its thickness, the radial legs 254 are much stiffer and lighter than the modified triangular cantilever springs 150 of the previous embodiments. This means that the radial legs of this embodiment 254 are not storing a substantial amount of elastic energy, nor do they possess much kinetic energy. Rather, they are transmitting elastic potential energy back and forth between the torsional elements 251 and the piston while adding minimally to the dynamic mass of the spring. The principal advantage of this type of spring structures is that potential energy is stored in torsional elements, which can store more potential energy per unit mass than do flexural springs, and what mass they do have is only moving minimally. This type of suspension spring structure should, therefore, be useful to higher frequencies than the previous types.

Figure 22:
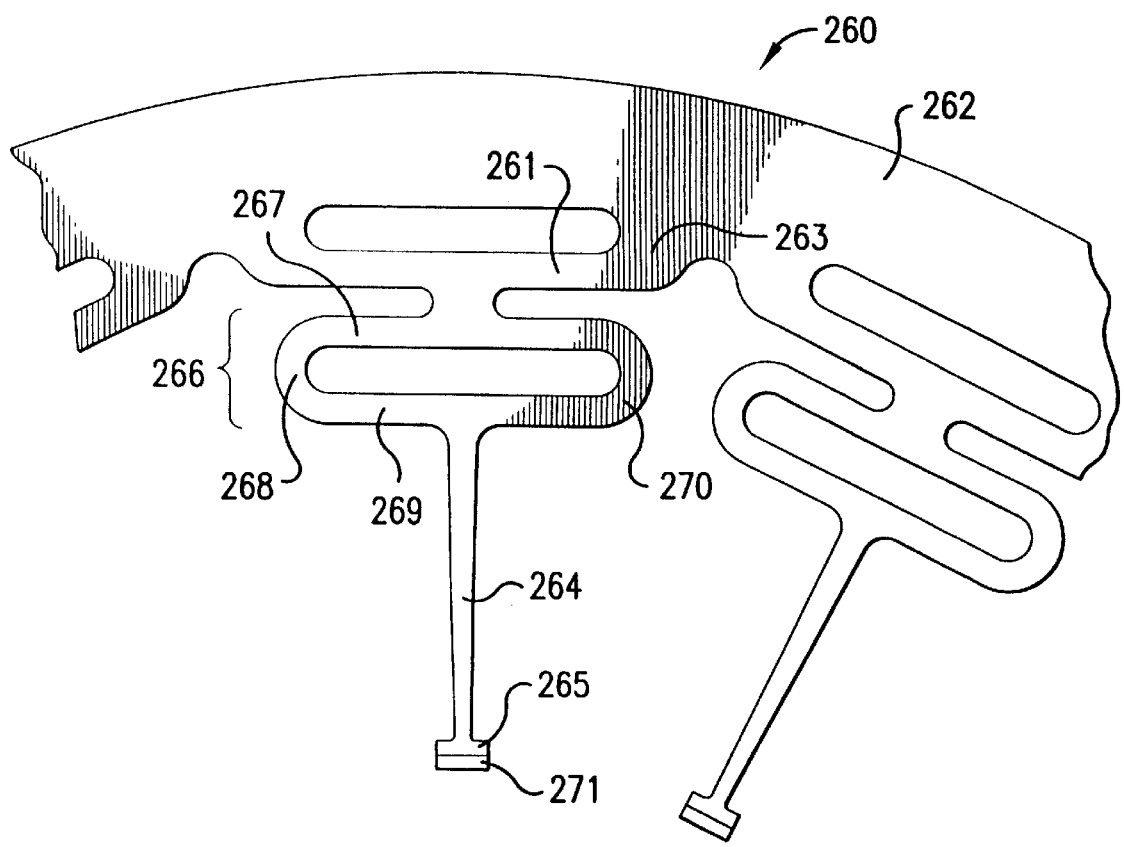
FIG. 22 is a plan view of a portion of another embodiment of the starfish spring-structure of FIG. 21.

FIG. 22 shows a portion of a second embodiment 260 of a suspension spring structure that features torsional elements. As before, potential energy is stored in a torsional element 261 which is connected to an outer clamping ring 262 through a connecting element 263. The restoring force is transmitted through radial legs 264. However, an additional energy storage loop 266 has been added, comprising torsional elements 267 and 269 and connecting elements 268 and 270. This embodiment of the spring structure can store more energy within a given outer clamping ring diameter than the spring structure 250 of FIG. 21, and therefore could be made to be more compact by reducing the outer diameter.

Figure 23:
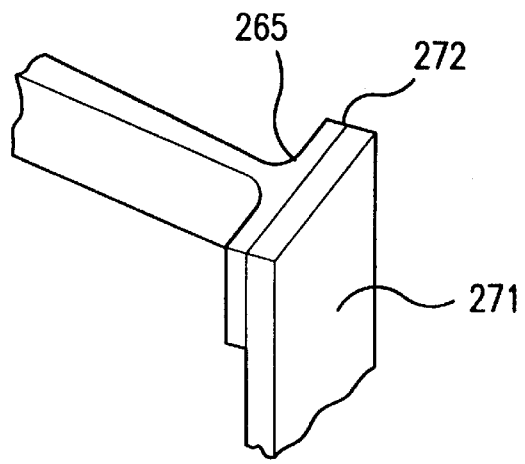
FIG. 23 is a detail of a perspective view of the tips of the beams of FIG. 22.

FIG. 23 shows in detail the tip 265 of a radial leg of the embodiment shown in FIG. 22. The tip has been widened to facilitate attachment to a connecting column 271 through a joint 272, as described previously in FIGS. 15–18.

Figure 24:
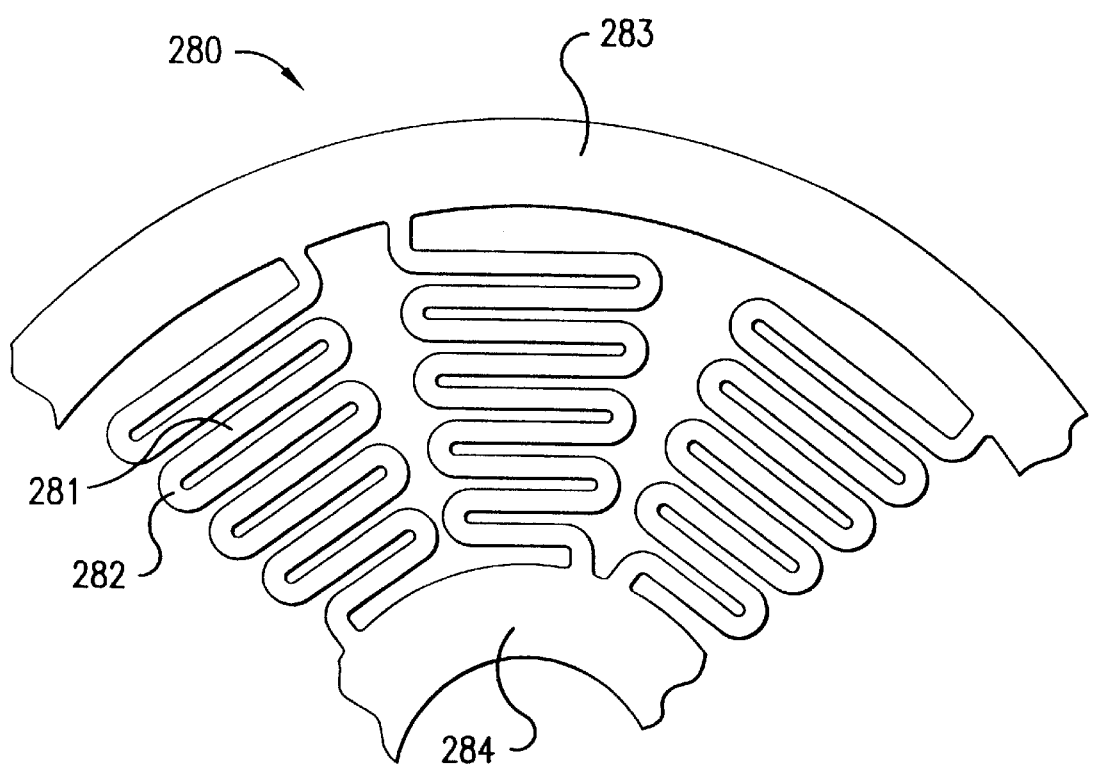
FIG. 24 is plan view of a portion of another embodiment of the starfish spring structure incorporating spring elements.

FIG. 24 shows an embodiment in which the space of a suspension spring structure 280 between an outer clamping ring 283 and an inner piston clamping ring 284 is packed with azimuthal (perpendicular to the radial direction) energy storage elements 281 connected by radial connecting elements 282. A zigzag arrangement of elements is shown in FIG. 24. The overall width of each zigzag, i.e. the biggest azimuthal distance between two points on the periphery of the zigzag, is decreasing gradually for each successive zigzag from the outer toward the inner ring. Although not shown, the loop arrangement of FIG. 23 may also be used to fill the space between the outer and inner rings. Each loop closer to the inner ring has smaller azimuthal width that the previous loop.

Figure 25:
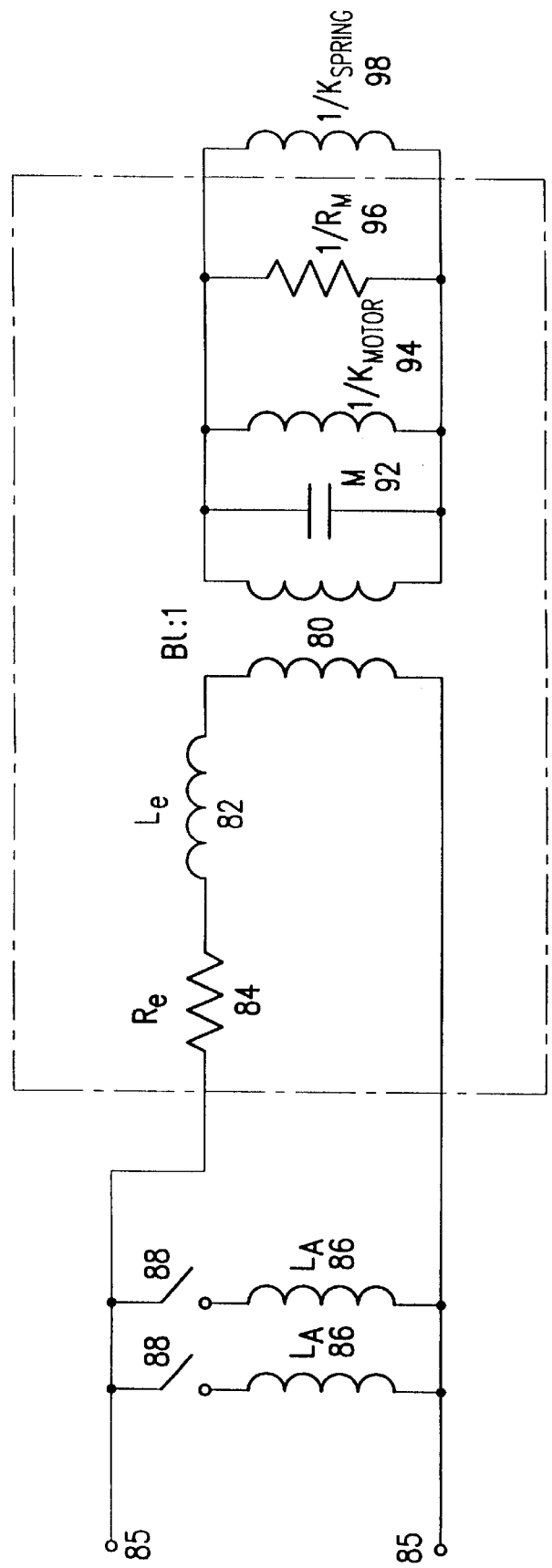
FIG. 25 is a schematic diagram of a moving-magnet electrodynamic motor equivalent circuit with two switched auxiliary stiffnless inductors according to the invention.

FIG. 25 illustrates, in a schematic diagram of an equivalent circuit model for the electrodynamic motor, another aspect of the invention. This aspect relates to the addition of one or more electrical inductors to the electrical side of the motor to effectively increase the suspension stiffness on the mechanical side of the electrodynamic motor. Although the current which passes through an added inductor will dissipate energy due to the electrical resistance of the added inductor, $R_{inductor}$ [Ω], inductors on the electrical side of the motor are used to make small adjustments to the overall stiffness of the motor, and hence provide a means of adjusting the mechanical resonance frequency of the motor. If the "electrical stiffness" produced by an inductor provides a small correction to the "elastic stiffness" of the mechanical spring, to act as a "tuning" element, then the associated dissipation added by the inductor may also be small enough so that it would not substantially degrade the motor's overall efficiency.

The electrical side of the motor is joined to the mechanical side by a transformer 80, which, as an equivalent, represents a ratio of Bl: 1, where Bl [Newtons/Amp] is the motor's force factor or transduction coefficient. To the left of the transformer 80 the electrical components of the motor include a motor coil electrical inductance 82 and a motor coil electrical resistance 84. Across the motor's electrical terminals 85 are placed any number of tuning inductors 86, which can be added to the circuit using single-pole, single-throw switches 88.

The mechanical side of the motor is represented by the three equivalent electrical components to the right of the transformer 80. The mechanical stiffness of the motor 10 is represented by a first inductor 94 having an inductance which is the reciprocal of the motor stiffness constant, $k_{motor}$. The mechanical stiffness of suspension spring structure is represented by a second inductor 98 having an electrical inductance which is the reciprocal of the suspension spring stiffness constant, $k_{spring}$. The moving mass of the driver is represented by a capacitor 92, which has an electrical capacitance that is equal to the total driver moving mass, which includes the sum of masses, M, of the driver moving part 11, the piston 30, and some fraction of the mass of the suspension spring structures. The mechanical damping present in the motor is represented by an electrical resistor 96 having a resistance which is the reciprocal of the motor's mechanical resistance, $R_m$.

If both switches 88 are open and nothing is connected to the motor electrical terminals 85, then the mechanical resonance frequency of the motor, $f=\omega/2\pi$, is determined only by the parameters on the mechanical side of the equivalent circuit.

$$\omega = \sqrt{\frac{k_{motor} + k_{spring}}{M}} \quad (14)$$

If one switch or both switches 88 are closed, then the tuning inductors 86 increase the effective stiffness on the mechanical side of the transformer 80, and the mechanical resonance frequency of the motor is increased.

Shown below in Table I, are the results of some measurements made using tuning inductors to modify the resonance frequency of a Model C-2 moving-coil electrodynamic motor of the Yarr/Corey type.

TABLE I

Effect of external electrical inductors on motor mechanical resonance frequency.

| Added Inductance (mH) | Mechanical Resonance Frequency (Hz) |
| --- | --- |
| 0.0 | 54.25 |
| 14.65 | 55.87 |
| 29.30 | 56.72 |

Table I. Effect of external electrical inductors on motor mechanical resonance frequency.

The stiffness augmentation methods and devices of the invention utilize modified triangular cantilever suspension springs, torsional suspension springs, and/or inductive stiffness enhancements to raise the mechanical resonance frequency of a moving-magnet electrodynamic motor and thereby improve its performance in the generation of high-amplitude sound fields at very high values of electroacoustic efficiency. Although the focus of the description and drawings has been on the application of this invention to thermoacoustic refrigerators and engines, it should be clear to the person of ordinary skill in the art that the stiffness enhancement techniques have far wider applicability, not only to thermoacoustic refrigerators and engines, but to many acoustical systems, such as sonic compressors, which may contain no thermoacoustic elements, or to Stirling engines or refrigerators. These stiffness enhancement techniques are also applicable for use with linear alternators.

The preferred embodiments and aspects of the invention have been presented in detail and will enable the person skilled in the art to construct other obvious and equivalent embodiments.

We claim:

1. A high-efficiency thermoacoustic driver, comprising:
   a linear electrodynamic motor having electrical termiinals and a moving part;
   a driver suspension housing;
   a piston connected to the moving part of the motor and having a piston stroke; and
   a stiffness-enhancing device for raising the mechanical resonance frequency of the electrodynamic motor without reducing the piston stroke.

2. The thermoacoustic driver of claim 1, wherein the stiffness-enhancing device is an electrical inductor attached to the electrical temninals of the motor.

3. The thermoacoustic driver of claim 1, wherein the stiffness-enhancing device is a starfish spring structure extending between the housing and the piston.

4. A high-efficiency thermoacoustic driver, comprising:
   a linear electrodynamnic motor having a moving part;
   a driver suspension housing;
   a piston connected to the moving part of the motor; and
   a starfish spring structure, which is optimized for stiffness, and which extends between, and is attached to the driver suspension housing and the piston plate.

5. The thermoacoustic driver of claim 4, wherein the starfish spring structure comprises a plurality of radial legs, each radial leg comprises a beam having a width that varies along its length so that the bending stiffness of the beam is optimized.

6. The thermoacoustic driver of claim 5, wherein each beam has two end cantilever sections and a middle section, and the width of the beam tapers from the end sections to the middle section to form a bow-tie shape.

7. The thermoacoustic driver of claim 6, wherein each beam is curved along its length to relieve arc length tension.

8. The thermoacoustic driver of claim 6, wherein the middle section is an arc-tension relief spring.

9. The thermoacoustic driver of claim 8, wherein the arc-tension relief spring is a ring.

10. The thermoacoustic driver of claim 5, wherein each beam is a tapered cantilever beam having a wide end and a narrow end, the narrow end being connected to the piston through a columnar body.

11. The thermoacoustic driver of claim 10, wherein each beam is attached to the columnar body through a gradual bend forming an integral bent spring.

12. The thermoacoustic driver of claim 5, wherein:
   the beams of the starfish spring structtre are made from one integral spring plate having an outer clamping ring; and
   each beam is connected to the outer ring through at least one torsional spring element.

13. The thermoacoustic driver of claim 12, wherein the torsional spring elements are g enerally perpendicular to the respective beam.

14. The thermoacoustic driver of claim 4, wherein each starfish spring structure is a plate optimized for torsional stiffness, the plate comprising:
   an outer clamping ring for attaching to the driver suspension housing;
   a n inner clamping ring for attaching to the piston; and
   a plurality of legs connecting the outer and inner rings, each leg having a radial spring element and an azimuthal spring element.

15. The thermoacoustic driver ofclain 14, wherein the spring elements form loops of decreasing overall width from the outer to the inner ring.

16. An auxiliary suspension device for enhancing the stifftess of an electrodynamic motor incorporated in a thennoacoustic driver, the driver having a driver suspension housing and a movable piston, the suspension device comprising:

an outer clamping ring for attaching to the driver housing; and a plurality of legs extending radially inwardly from the outer ring to the piston, each leg being connected to the outer ring and the piston, and having a width that decreases in the radial inwardly direction, and each leg comprising a radial spring element and an azimuthal spring element.

17. The device of claim 16, wherein each leg is attached to the piston through a columnar body.

18. The device of claim 16, wherein:

the suspension device has an inner clamping ring for attaching to the piston; and the spring elements form a plurality of loops of decreasing overall width from the outer to the inner ring.

19. An auxiliary suspension device for enhancing the stiffness of an electrodynamic motor incorporated in a thermoacoustic driver, the driver having a driver suspension housing and a movable piston, the suspension device comprising:

a starfish spring structure, which is optimized for bending stiffness, the structure being attached to the driver suspension housing and the piston.

20. The device of claim 19, wherein each starfish spring structure comprises a plurality of radial legs, each radial leg comprising a beam having a width that varies along its length so that the bending stiffness of the beam is optimized.

21. The device of claim 20, wherein each beam has two end cantilever sections and a middle section, the width of the beam tapering from the end sections to the middle section to form a bow-tie shape.

22. The device of claim 21, wherein each beam is curved along its length to relieve arc length tension.

23. The device of claim 21, wherein the middle section is an arc-tension relief spring.

24. The device of claim 23, wherein the starfish spring structure has an even number of legs, each arc-tension relief spring has a twist with a handedness, and the handedness of the twist alternates from one leg to the next.

25. The device of claim 23, wherein the arc-tension relief spring is a ring.

26. The device of claim 20, wherein each beam is a tapered cantilever beam having a wide end and a narrow end, the narrow end being connected to the piston through a columnar body.

27. The device of claim 26, wherein each beam is attached to the columnar body through a gradual bend forming an integral bent spring.

\* \* \* \* \*

UNITED STATES PATENT AND TRADEMARK OFFICE
CERTIFICATE OF CORRECTION

PATENT NO. : 6,307,287 B1
DATED : October 23, 2001
INVENTOR(S) : Steven L. Garrett et al.

It is certified that error appears in the above-identified patent and that said Letters Patent is hereby corrected as shown below:

Column 4,
Line 12, replace "do ing" with -- doing --.
Line 16, replace "wi th" with -- with --.

Column 5,
Line 63, replace "rotatedby" with -- rotated by --.

Column 6,
Lines 35 and 64, replace "ofthe" with -- of the --.

Column 7,
Line 15, replace "ofthe" with -- of the --.
Line 30, replace "stiffnless" with -- stiffness --.
Line 40, replace "ofthe" with -- of the --.

Column 8,
Line 47, replace "14,to" with -- 14, to --.

Column 9,
Line 1, replace "24,which" with -- 24, which --.
Line 10, replace "68,which" with -- 68, which --.

Column 10,
Line 52, replace "ofthe" with -- of the --.

Column 11,
Line 38, replace "ofthe" with -- of the --.
Line 52, replace "ofmodified" with -- of modified --.

Column 13,
Line 35, replace "orwith" with -- or with -- and replace "amore" with -- a more --.

Column 14,
Line 25, replace "ofthe" with -- of the --.

Column 15,
Lines 5 and 22, replace "ofthe" with -- of the --.

UNITED STATES PATENT AND TRADEMARK OFFICE
CERTIFICATE OF CORRECTION

PATENT NO. : 6,307,287 B1
DATED : October 23, 2001
INVENTOR(S) : Steven L. Garrett et al.

It is certified that error appears in the above-identified patent and that said Letters Patent is hereby corrected as shown below:

Column 16,
Line 7, replace "termiinals" with -- terminals --.
Line 57, replace "g enerally" with -- generally --.
Line 64, replace "a n" with -- an --.

Column 17,
Line 1, replace "ofclaim" with -- of claim --.
Lines 5-6, replace "then-noacoustic" with -- thennoacoustic --.

Signed and Sealed this

Twenty-first Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,307,287 B1 |
| APPLICATION NO. | : 09/521368 |
| DATED | : October 23, 2001 |
| INVENTOR(S) | : Garrett et al. |

It is certified that error appears in the above-identified patent and that said Letters Patent is hereby corrected as shown below:

In the Specification

Column 1, Line 10, insert the following:

--STATEMENT OF GOVERNMENT RIGHTS

This invention was made with Government support under Contract No. N00039-97-D-0042, Delivery Order No. 111, awarded by the Naval Sea Systems Command (NAVSEA). The Government has certain rights in the invention.--

Signed and Sealed this
Twenty-fifth Day of June, 2013

Teresa Stanek Rea
*Acting Director of the United States Patent and Trademark Office*